United States Patent [19]

Beebe et al.

[11] Patent Number: 5,151,870
[45] Date of Patent: Sep. 29, 1992

[54] APPARATUS AND METHOD FOR DETERMINING A CENTER AND MEASURING WITH REFERENCE THERETO

[75] Inventors: James C. Beebe, Kent; Barry D. Cargould, Hudson; David W. Lees, Sr., North Canton, all of Ohio

[73] Assignee: Illinois Tool Works Inc., Chicago, Ill.

[21] Appl. No.: 439,231

[22] Filed: Nov. 17, 1989

[51] Int. Cl.⁵ ............................................. G01B 21/00
[52] U.S. Cl. .................................... 364/556; 364/560; 33/543; 33/546; 33/554; 33/548; 33/203; 33/644
[58] Field of Search ............... 364/556, 560; 33/501.6, 33/543, 546, 548, 550, 551, 552, 553, 554, 555, 555.1, 644, 203, 600, 545, 547; 382/8; 356/384, 386, 387; 250/492.1

[56] References Cited

U.S. PATENT DOCUMENTS

| | | | |
|---|---|---|---|
| 3,245,148 | 4/1966 | Whitney | 33/550 |
| 3,480,141 | 10/1969 | Rock, Jr. | 209/80 |
| 3,604,248 | 9/1971 | Altmann | 33/550 X |
| 4,007,992 | 6/1975 | Petrohilos et al. | 356/160 |
| 4,026,031 | 5/1977 | Siddall et al. | 33/543 |
| 4,030,201 | 6/1977 | Possati et al. | 33/543 X |
| 4,063,103 | 12/1977 | Sumi | 250/492 |
| 4,077,130 | 3/1978 | Possati et al. | 33/548 X |
| 4,097,158 | 6/1978 | Dehait | 356/160 |
| 4,184,263 | 1/1980 | Tatsumi et al. | 33/550 X |
| 4,678,337 | 7/1987 | Cohen et al. | 356/387 |
| 4,679,447 | 7/1987 | Sieradzki et l. | 33/550 X |
| 4,775,236 | 10/1988 | Cohen et al. | 356/387 |
| 4,775,947 | 10/1988 | Marron | 33/550 X |

FOREIGN PATENT DOCUMENTS 0772815 10/1980 U.S.S.R. ................................ 33/550

OTHER PUBLICATIONS

M. Orlowski & M. Pachter, "Linear Programming in $R^3$ and the Skeleton and Largest Incircle of a Convex Polygon", Comput. Math. Applic. vol. 13, No. 4, pp. 401-405, 1987.

William E. Drews, "How to Measure Roundness", Tooling & Production, pp. 156-160, Jun. 1978.

American National Standard, "Measurement of Out-Of-Roundness", The American Society of Mechanical Engineers, ANSI B89.3.1-1972, pp. 1-26.

Sales Specification, Model 100 Wheel Uniformity SPC Machine; Specification 108-290-107 Revision 6, Feb. 1989 in its entirety.

Akron Standard Drawing No. 7682 dated Jun. 15, 1983 including revisions through revision 1 dated Jun. 21, 1984.

Akron Standard Drawing No. 8082 dated Jun. 11, 1984 (Revision 0).

Akron Standard Drawing No. 7541 dated Aug. 22, 1983 including revisions through revision 7 dated Nov. 15, 1984.

Primary Examiner—Joseph L. Dixon
Attorney, Agent, or Firm—Wood, Herron & Evans

[57] ABSTRACT

An object is positioned in fixed relation to a measuring axis without regard to centering the object on the axis and at least one series of data samples correlated to the distance between the measuring axis and a series of points located at angularly spaced intervals on at least one surface feature of the object are generated and stored. To determine the center of a first surface feature, the corresponding series of samples is analyzed to identify samples therein corresponding to points lying on a maximum inscribed circle whose center corresponds to that of the surface feature. To measure a second surface feature of an object with reference to the center of a first surface feature thereof, a first signal and a second signal correlated to the distance between the measuring axis and points on the first surface feature and second surface feature, respectively are generated. The center of the first surface feature is then determined to define a vector indicating the positional offset between the measuring axis and that center. The second signal is then adjusted in accordance with that vector to provide a coordinate-corrected signal to be used as a basis for a centered measurement.

44 Claims, 7 Drawing Sheets

APPARATUS AND METHOD FOR DETERMINING A CENTER AND MEASURING WITH REFERENCE THERETO

FIELD OF THE INVENTION

The present invention relates to the field of centering and making centered measurements of surface features of an object. More particularly, the present invention relates to an apparatus and method for determining the center of a surface feature of an object, such as the center of the pilot hole of a wheel, and for making measurements such as measurements of effective size, out-of-roundness, runout and/or eccentricity of that surface feature or other surface features of the object with reference to that center.

BACKGROUND OF THE DISCLOSURE

In a wide variety of manufacturing and quality assurance applications it is necessary to precisely locate the center of a surface feature of an object in order to position the object or to carry out various measurements such as measurements of effective size, out-of-roundness, runout and/or eccentricity. The methods and equipment used to measure vehicle wheels and their components are good examples of such applications.

By way of background, wheels are normally manufactured from two components: a central disk or "spider" which is press fitted and welded inside a tire-supporting rim. The rim and disk each possess a number of significant surface features which, in order to produce a satisfactory wheel, must be properly shaped and/or maintained in a desired positional relationship with other surface features of the same component or, in the case of an assembled wheel, positioned correctly with respect to certain surface features of its mating component.

For instance, the disk usually contains a central pilot hole adapted to receive the center flange of a vehicle hub. The pilot is usually surrounded by a so-called "bolt circle" which comprises an array of four or five mutually spaced smaller holes ringing the pilot hole. The holes in the bolt circle receive lug bolts for effectively securing the disk to the hub. The bolt circle must be maintained concentric with the pilot hole within controlled tolerances. Also, the profile of the pilot hole must be suitably round and of a proper effective size to ensure it will fit onto the vehicle hub correctly. As used herein, the "effective size" of a circular feature refers to the size of the mating feature of perfect roundness that will fit the feature with zero clearance. Plug and ring gauges are familiar examples of precision made mechanical devices which can be used to measure the effective size of inside and outside dimensions, respectively. The rim component of a wheel also includes a number of surface features of significance including pairs of opposed bead seats and safety humps, respectively, each of which must be of a proper diameter and properly centered with respect to one another on the rim. When the wheel is assembled, it is important that bead seats on the rim also be centered properly with respect to the pilot and/or bolt circle on the disk.

To carry out these and other measurements, machines for measuring wheels or wheel components have generally relied on the use of precision mechanical fixturing devices to mechanically locate the center of a surface feature of the component or assembly to be measured by means of engagement with that surface feature to physically align the surface feature with a known center axis associated with the fixture. For example, it has been known to mechanically center a wheel or component to be measured by mounting it on a precision fixture known to be perfectly round and of an exactly known size, with the center axis of the fixture serving as a measuring reference axis. Provided the fixture is sized to tangentially engage the pilot hole or other surface feature (at at least two points in the case of an elliptical profile and at least three points otherwise) such a fixture serves to mechanically center the surface feature on the fixture even though the profile of the feature may not be truly round as it should be. The effective size of the surface feature is equal to the diameter of the engaging portion of the fixture which effectively functions as either a plug gauge or ring gauge depending on whether the fixture engages the surface feature from the inside or outside, respectively.

However, precision mechanical fixtures of this type are subject to wear which degrades the accuracy of measurements made using them. Also, in the event of changes in the size and/or shape of the surface feature due to manufacturing variations, a differently sized fixture would be required thereby necessitating change-over delays as well as the expense of fabricating fixtures of different sizes. In attempt to overcome the difficulties associated with precision mechanical fixtures, adjustable mechanical centering devices such as expandable collets have also been known. While eliminating the need for fixtures of different sizes, adjustable devices of this type are even more expensive to fabricate and are also subject to wear.

It has also been known to gauge the size of a profile of a surface feature of an object by arranging electromechanical distance or angle transducers to respond to degree to which an expandable collet must open to properly engage the surface feature. However, such equipment is also expensive to fabricate with good precision and is subject to degraded performance through mechanical wear. Moreover, measurements made this way are not always satisfactory since the size and shape of the collet may prevent it from engaging an imperfectly circular surface feature at locations which accurately reflect the effective size of the surface feature or its true center.

The American National Standard for Measurement of Out-Of-Roundness, ANSI B89.3.1-1972, describes a number of techniques for determining the center of a profile including the Minimum Radial Separations (MRS), Least Squares Circle (LSC), Maximum Inscribed Circle (MIC), and Minimum Circumscribed Circle (MCC) methods. The standard recognizes that determination of the Maximum Inscribed Circle (MIC) associated with a polar profile is useful when it is desired to read the out-of-roundness of a polar profile in terms of the radial deviations from the interior of the profile to the perimeter of the largest ideally round plug gauge which can be fitted to it (i.e. the radial deviation between the actual profile and the circle defining its effective size). The standard further recognizes that the MIC and MCC techniques are both useful constructs for centering an arc.

Unfortunately, neither ANSI B89.3.1-1972 nor any other prior art Applicants are currently aware of describes a way of accurately and rapidly determining the maximum inscribed circle (MIC) of a surface feature in a manner which does not rely on trial and error and which is readily adaptable to the construction of automated or semiautomated measuring machines which do not rely on a human operator to determine measurement values. For instance, the above ANSI standard proposes finding the maximum inscribed circle "graphically by trial and error with the aid of a bow compass or engraved circles on a transparent template". Further according to that standard, to "determine the out-of-roundness value from meter or indicator readings alone the part must be centered to produce either two or three equal minimum readings depending on the profile shape. If the overall figure is 2-lobed, i.e. oval or elliptical, proper centering will produce two minimum readings spaced at 180 degrees. All other figures should be centered to produce at least three equal minimum readings spaced over more than 180 degrees." ANSI B89.3.1-1972 at page 11 (emphasis added). However, the standard provides no guidance on how such centering could be carried out by a machine and without the use of trial and error.

SUMMARY OF THE INVENTION

In view of the foregoing shortcomings of the prior art, it is an objective of the present invention to provide an apparatus and method for precisely determining the center of a surface feature of an object by locating the maximum inscribed circle associated with that surface feature without relying on precision mechanical fixturing devices to mechanically locate the center of the surface feature by engaging the surface feature to physically position the surface feature in alignment with the center axis of the fixture and without relying on trial and error techniques and locating the center of that maximum inscribed circle.

It is a further object of the invention to provide such an apparatus and method for determining the center of a surface feature of an object by locating the center of the maximum inscribed circle associated with that surface feature in the above manner and for carrying out precise measurements of that surface feature with reference to that center including measurements of out-of-roundness and total indicated runout (TIR).

It is a further object of the invention to provide an apparatus and method for precisely measuring the effective size of a surface feature of an object by locating the maximum inscribed circle of the surface feature in the above manner and calculating the diameter thereof as a measure of effective size.

It is a further object of the present invention to provide an apparatus and method for determining the center of a first surface feature of an object by locating the center of the maximum inscribed circle thereof in the above manner and for carrying out measurements of a second surface feature with reference to that center including measurements of the total indicated runout of the second surface feature and the eccentricity between the two surface features.

It is a further object of the invention to provide an apparatus and method of the type referred to immediately above wherein data correlated to the distance between said first and second surface features and a measuring axis are acquired substantially simultaneously in order to carry out said measurements quickly.

In furtherance of the foregoing objects, one aspect of the invention provides an apparatus and method for measuring a surface feature of an object with reference to a center without requiring the object or the surface feature to be physically aligned with some predetermined measuring reference. According to this aspect of the invention, the object whose surface feature is to be measured is positioned in fixed relation to a measuring axis without regard to whether the object or the surface feature is aligned on center with the measuring axis. Using contact or non-contact distance measuring probes, two signals preferably in the form of two series of data samples are then generated, preferably simultaneously with one another. The first series of data samples represents the distance between a location fixed with respect to the measuring axis and a first series of n points on a first surface feature, the center of which corresponds to the desired measuring center. The second series of data samples represents the distance between the same or another location fixed with respect to the measuring axis and a second series of n angularly corresponding points located on the second surface feature, i.e., the surface feature to be measured. The angle of each data sample in each series is measured with respect to the measuring axis.

From the coordinates of the points in the first series, the coordinates of the center of the first surface feature may be found using any suitable technique. For example, that center may be found by determining the center of a best fit locus of points, such as a circle, to the first series of points but is preferably determined from the first series of points using the maximum inscribed circle (MIC) technique to be described. The coordinates of the center of the first surface feature define a vector indicative of the positional offset between the center of the first surface feature and the measuring axis. The coordinates of the center of the first surface feature are then combined with the coordinates of each point in the second series of points to effectively shift the position of each point in the second series in accordance with the magnitude and angle of the vector thereby generating a coordinate-corrected representation of the second series of data samples. The coordinates of each point in the coordinate-corrected representation are substantially identical to the coordinates that would have been obtained by mechanically centering the first surface feature on the measuring axis to prior art technique. The coordinate-corrected representation can be used to calculate the center of the second surface feature with respect to the measuring axis or to carry out other measurement calculations.

Another aspect of the invention provides an apparatus and method for determining the center of a surface feature of an object and measuring with reference to that center which does not require the part to be mechanically centered with a predetermined reference. According to the invention, the object is positioned in fixed relation to a measuring axis without regard to whether the object or the surface feature is centered on the axis. A series of data samples correlated to the distance between a point on the measuring axis and one of a corresponding series of points located at angularly spaced intervals on the surface feature are generated and stored. The stored series of data samples is then analyzed to identify at least three samples therein corresponding to respective points lying on the maximum inscribed circle associated with the surface feature. The center of the surface feature corresponds to the center of the maximum inscribed circle which is then calculated. The effective size of the surface feature may then be measured in accordance with the diameter of its maximum inscribed circle.

For example, in a preferred embodiment of a wheel measuring machine constructed in accordance with the above principles of the invention, a wheel to be measured is secured to the machine in fixed relation to a measuring axis of the machine but without concern for precisely mechanically centering the wheel on the measuring axis. The wheel is then rotated about the measuring axis while a distance-measuring probe contacts the pilot hole of the wheel to measure the instantaneous distance between the inner surface of the pilot hole and the measuring axis of the machine. At the same time, other probes sense the instantaneous distance between the machine axis and one or more other surface features to be measured, such as a bead seat of the wheel. Each set of distance data from each probe is electronically filtered, sampled and digitized. A computer determines the center of the pilot using the maximum inscribed circle (MIC) technique described later and algebraically sums the coordinates of the center of the MIC with the coordinates of each sampled point on the surface feature being measured in order to refer the coordinates of each point to the center of the pilot.

These and other aspects and advantages of the invention will become more readily apparent from the following detailed description taken in conjunction with the accompanying drawings wherein like reference numerals denote like items and in which:

BRIEF DESCRIPTION OF THE DRAWINGS

FIG. 3I illustrates the steps in addition to those of FIGS. 3A through 3H carried out by the computer 50 of FIG. 1 in order to determine the out-of-roundness of a surface feature of an object.

DETAILED DESCRIPTION OF THE PREFERRED EMBODIMENT

Figure 1:
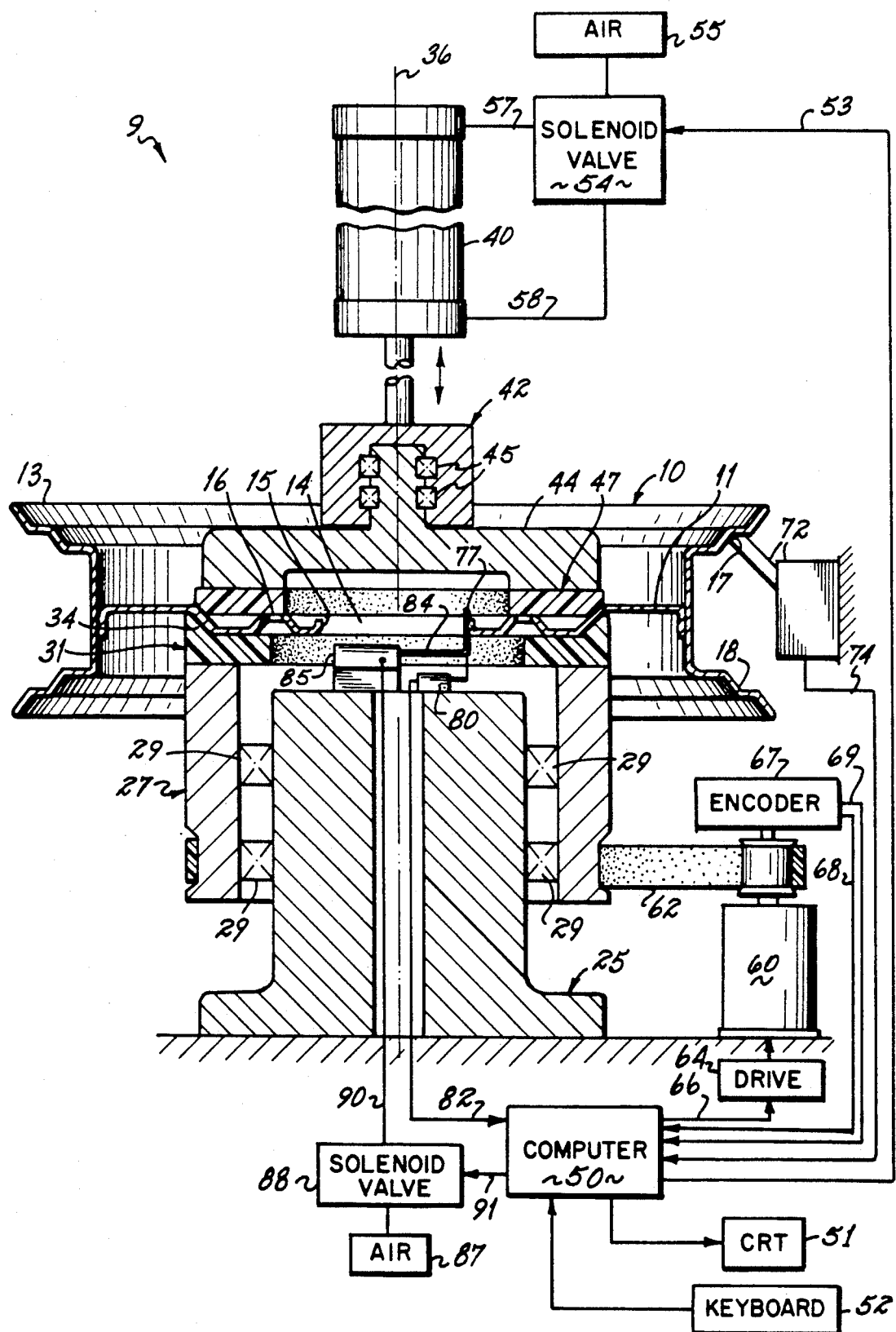
FIG. 1 is a diagrammatic cross-sectional view of a wheel measuring machine constructed according to the principles of the invention shown together with a wheel assembly.

Referring now to FIG. 1 there is shown a center locating and measuring apparatus 9 upon which a wheel assembly 10 to be measured has been mounted. Wheel assembly 10 includes a generally circular central disk 11 which spans the interior opening of a generally circular rim 13. Both rim 13 and central disk 11 may include a number of significant surface features. For example, central disk 11 includes a generally circular, generally centrally located, pilot hole 14 bounded by a peripheral edge 15. Pilot hole 14 is surrounded by an array of bolt holes 16. Rim 13 includes a number of significant surface features such as a pair of mutually opposed, generally circular bead seats 17 and 18.

Machine 9 includes a fixed pedestal 25 which supports a lower spindle 27 rotatably mounted upon pedestal 25 by means of bearings 29. Lower spindle 27 in turn supports a lower fixture 31 which may suitably comprise a pad of rubber having a tapered rim 34 matable with disk 11 in order to approximately center wheel 10 with the measuring axis 36 of machine 9.

Wheel 10 may be selectively clamped in a fixed position with respect to measuring axis 36 by means of a retractable clamp assembly which includes an air cylinder 40 coupled to an upper chuck 42. An upper spindle 44 is rotatably mounted to upper chuck 42 by means of bearings 45. Spindle 44 carries an upper fixture 47 which may also suitably comprise a pad of rubber. Wheel 10 may be selectively clamped between upper and lower fixtures 47 and 31 (as shown in FIG. 1) or released to permit wheel 10 to be removed from machine 9 under the control of a computer 50 which is connected to an input device such as a keyboard 52 as well as a display device such as a CRT 51. Computer 50 may suitably comprise an IBM PS-2 model 80 with math coprocessor and TURBO PASCAL version 5 compiler.

In addition to performing other functions to be described, computer 50 generates a clamp control signal on a line 53 which is coupled to a solenoid valve 54. Valve 54 is supplied with air pressure from an air supply 55 operates to extend cylinder 40 in order to clamp wheel 10 in a fixed position with respect to measuring axis 36 by pressurizing a first air line 57 when valve 54 is energized by signal 53. In order to retract cylinder 40 and upper fixture 47, signal 53 deenergizes valve 54 to release wheel 10 air line 57 is depressurized and a second air line 58 coupled between valve 54 and cylinder 40 is pressurized.

When clamped between fixtures 45 and 31, wheel 10 can be selectively rotated about measuring axis 36 under the control of computer 50. To accomplish this, lower spindle 27 is coupled to a gear motor 60 by way of a timing belt 62. Gear motor 60 is operated by a motor drive 64 which receives motor control signals 66 from computer 50.

In order to establish a series of measurement sample points, the rotation of wheel 10 is monitored by an encoder 67 which generates a constant number of evenly angularly spaced, encoder pulses on line 68 each time wheel 10 rotates one revolution. Also once each revolution of wheel 10 encoder 67 also generates a reference pulse on a line 69 connected to computer 50. The reference pulse represents a particular rotational position of wheel 10. By numbering each encoder pulse with respect to the occurrence of the previous reference pulse, computer 50 can identify the exact rotational position of wheel 10 associated with each encoder pulse. Encoder 67 may comprise a commercially available shaft encoder connected to the output shaft of motor 60 by way of gearing (not shown) permitting encoder 67 to rotate synchronously with wheel 10. Alternatively, encoder may be a non-contact type such as the optical device disclosed for use as a loadwheel encoder in commonly assigned U.S. Pat. No. 4,815,004 which is expressly incorporated herein by reference in its entirety. Those skilled in the art will also recognize that it is possible to eliminate encoder 67 by closely regulating the rotational speed of spindle 27, such as by substituting a synchronous motor for motor 60 and programming computer 50 to sample lines 82 and 74 at predetermined intervals of time.

Machine 9 further includes distance measuring devices for measuring the distance between reference points fixed with respect to measuring axis 36 and surface features of interest on wheel 10. In the embodiment illustrated in FIG. 1 for example, a distance measuring probe 72 which preferably comprises an electromechanical transducer of the differential transformer (e.g. LVDT) type having a member biased into contact with wheel 10, the member being mechanically coupled to the core of the LVDT. Probe 72 may also suitably comprise a potentiometer probe of the contact type or any of a number of non-contact distance measuring devices such as laser or Hall effect probes. Probe 72 measures the distance between bead seat 17 and measuring axis 36 by transmitting a distance signal to computer 50 by way of a line 74. Similar probes (not shown) may be provided for measuring the distance between axis 36 and other surface features of wheel 10 such as bead seat 18 or other surface features of interest.

A second distance measuring device is also provided to measure the distance between axis 36 and points on the peripheral edge 15 of pilot hole 14 in accordance with a second distance signal provided to computer 50. While any of the precision distance measuring devices noted above may be used, the embodiment illustrated in FIG. 1 employs a probe 77 in the form of a small diameter rigid pin mechanically coupled to the core movable of an LVDT 80, the body of which is fixedly mounted upon pedestal 25. LVDT 80 provides a second distance measuring signal to computer 50 by way of a line 82. When measurements are being taken, probe 77 is forcibly biased into contact with edge 15 by means of a piston 84 and air cylinder 85 the latter of which is connected to an air supply 87 by way of a solenoid valve 88 and an air line 90. In order to permit computer 50 to control the position of probe 77, solenoid valve 88 is connected to computer 50 by way of a line 91 which computer 50 energizes to bias probe 77 into engagement with edge 15 when carrying out measuring operations. At the end of each measuring cycle, computer 50 deenergizes line 91 to retract probe 77 in order to facilitate substitution of one wheel 10 for another without mechanical interference from probe 77.

Except for the data processing steps carried out by computer 50 which will be described in detail hereinafter, the operating cycle of machine 9 may be briefly summarized as follows. Initially, solenoid valves 54 and 88 as well as drive 64 and motor 60 are maintained by computer 50 in a deenergized state. Accordingly, cylinder 40 holds upper spindle 44 and upper fixture 47 upwardly away from lower fixture 31 with sufficient clearance to allow a wheel 10 to be loaded onto lower fixture 31. Air cylinder 85 holds probe 77 retracted radially inwardly to avoid mechanical interference with wheel 10 as it is loaded either manually or by automatic loading means (not shown) onto machine 9. For the same purpose, probe 77 is preferably maintained in a wheel-disengaging position by mechanical retracting means (not shown). The tapered rim 34 of lower fixture 31 facilitates the approximate centering of wheel 10 although, as will be described in detail hereinafter, the invention eliminates the need to precisely center wheel 10 with respect to any given reference such as measuring axis 36.

Once wheel 10 is seated upon lower fixture 31, a START command is entered into computer 50 by way of keyboard 52 in order to initiate a test sequence during which one or more of the center locating and/or measuring operations to be described in detail hereinafter is carried out. Prior to entry of the START command, keyboard 52 may also be used to select various options such as the types of measurements to be made or the manner in which measurement results are to be stored, displayed or otherwise utilized. In response to the START command, computer 50 energizes solenoid valve 54 in order to clamp wheel 10 in a fixed position with respect to measuring axis 36 by extending cylinder 40 downwardly so that upper fixture 47 bears downwardly upon wheel 10, clamping it against lower fixture 31. Next, distance measuring probes are energized and brought into distance-sensing relation with each surface feature of wheel 10 to be measured. To do so, solenoid valve 88 is energized by computer 50 causing air cylinder 85 to extend short of its full travel to hold probe 77 in forced contact with the peripheral edge 15 of pilot hole 14. Probe 72 is also moved into a wheel-engaging position whereat it is maintained in distance-sensing relation with the bead seat 17 of rim 13. By virtue of the mechanical coupling between its core and probe 77, LVDT 80 provides to computer 50 by way of line 82 a signal correlated to the distance between axis 36 and the point on the edge 15 of pilot hole 14 contacted by probe 77. Similarly, computer 50 receives via line 74 a signal correlated to the distance between axis 36 and the point on bead seat 17 contacted by probe 72.

Computer 50 then activates drive 64 which in turn energizes motor 60 which rotates lower spindle 27 and thus, wheel 10 by driving timing belt 62. Once each revolution of wheel 10, encoder 67 generates and sends to computer 50 by way of line 69 a single reference pulse which identifies a particular angular reference position of wheel 10. Each revolution of wheel 10, encoder 67 also generates and sends to computer 50 by way of line 68 a constant number, such as two hundred fifty six (256) equiangularly spaced encoder pulses each of which corresponds to a particular angular position of wheel 10. Computer 50 uniquely identifies each said angular position by assigning an ordinal number, n, to each pulse on line 68 in relation to the total number of pulses appearing thereon since the most recent appearance of a reference pulse on line 69. Synchronously with the occurrence of each encoder pulse on line 68 and continuing for one complete revolution of wheel 10, computer 50 samples line 82 the values of the distance signals appearing on line 82 and stores a first series of data samples indicating the distance between measuring axis 36 and a series of points along the edge 15 of pilot hole 14.

Computer 50 stores each series of sampled distance values in memory, preferably in the form of a table relating each angular position to numerical values representing the distance between measuring axis 36 and angularly corresponding points on each surface feature of interest. During the same revolution of wheel 10, computer 50 generates a corresponding additional series of data samples for each additional surface feature of interest. For example, in the embodiment of FIG. 1, computer 50 samples the distance signals on line 74 and stores a second series of data samples representing the distance between measuring axis 36 and a series of points on bead seat 17. The stored data is processed by computer 50 in the manner to be described below and the results of the measurement are displayed by computer 50 on CRT 51 or otherwise post-processed.

Upon completion of the measurement, computer 50 deactivates drive 50 in order to stop the rotation of wheel 10. Once wheel 10 stops, as indicated by the cessation of encoder pulses on line 68, computer 50 deenergizes solenoid valve 88 to retract probe 77 and raises upper fixture 47 clear of wheel 10 by deenergizing solenoid valve 54 so that wheel 10 may be removed and the foregoing operations repeated for the next wheel to be measured.

Determining a Center of a Surface Feature

Figure 2:
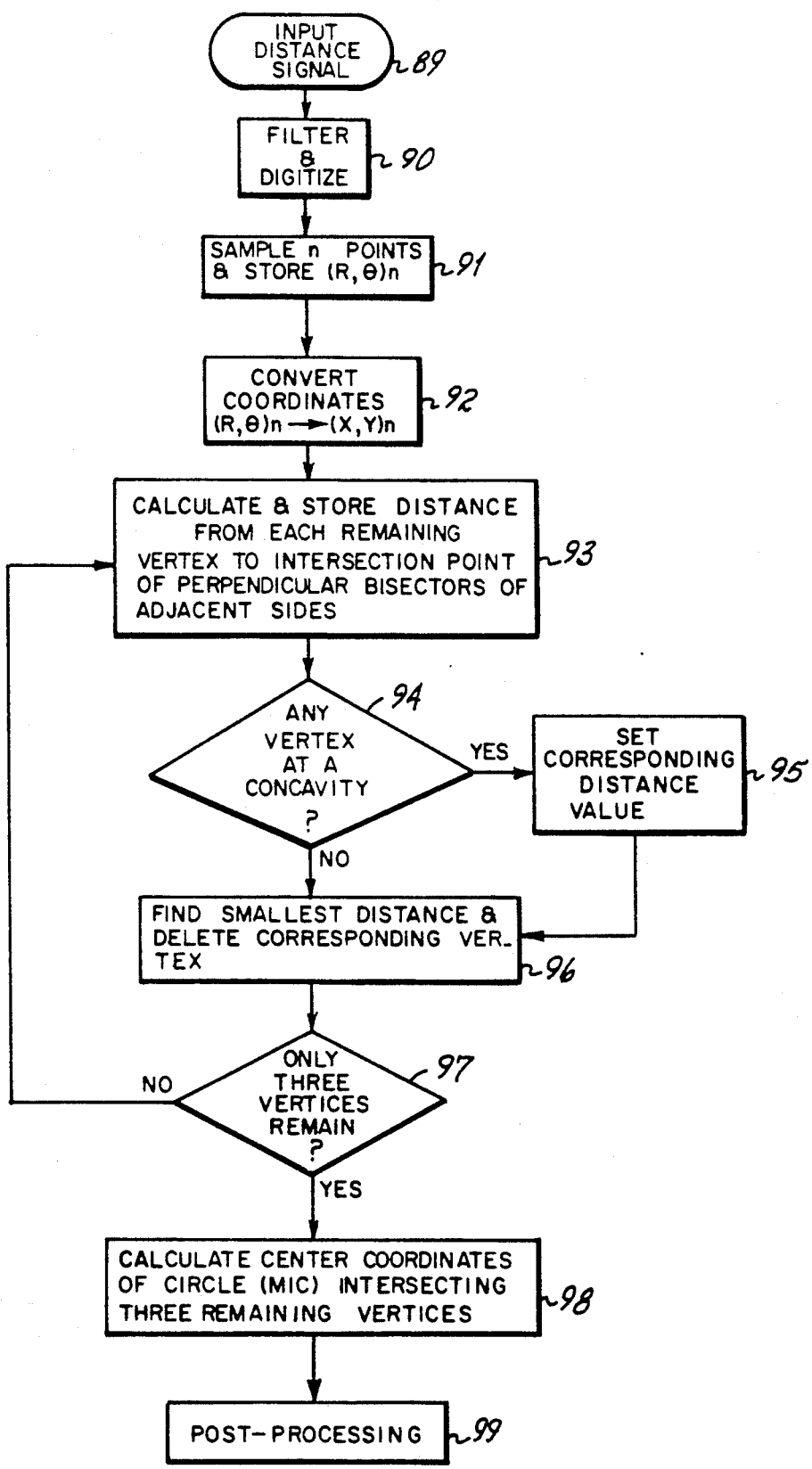
FIG. 2 is a simplified flowchart illustrating the manner in which a center of a surface feature of an object is determined in accordance with the present invention.

The manner in which computer 50 determines a center of a surface feature of an object will now be summarized with reference to the flowchart of FIG. 2. At 89, computer 50 substantially simultaneously receives one or more distance signal inputs generated by probe 77 and/or LVDT 80 by way of line 74 and/or line 82, respectively. Each analog distance signal is low pass filtered and digitized according to conventional techniques at step 90. Step 90 is preferably carried out by conventional low pass filter and analog to digital conversion circuitry (not shown) interposed between computer 50 and lines 82 and 74. At 91, computer 50 samples the digitized signal synchronously with the occurrence of the encoder pulses presented to computer 50 on line 68. Each encoder pulse is assigned an angle value, $\theta$, corresponding to the angle at which the sample is taken with reference to the last reference pulse detected by computer 50 on line 69. As noted previously, the encoder 67 of the preferred embodiment shown in FIG. 1 generates two hundred fifty six (256) encoder pulses per revolution of wheel 10. Accordingly, in the preferred embodiment, n=two hundred fifty six (256). The magnitude, R, of each of the n samples in each series of data samples corresponding to a surface feature of interest is stored by computer 50 together with the angle, $\theta$, associated with that sample in polar coordinate $(R,\theta)_n$ form.

Computer 50 converts each of the n samples in each series from polar form to Cartesian coordinate form $(X,Y)_n$ at step 92. As will become even more apparent upon consideration of the example to be described hereinafter with reference to FIGS. 3A-3H, each of the n samples in each series stored within computer 50 represent the position of a vertex of an n-sided polygon. At step 93, computer 50 calculates and stores in a table in memory the distance from each vertex $(X,Y)_n$ to the point at which the perpendicular bisectors of the adjacent sides of the polygon intersect. Computer 50 checks at step 94 to determine whether any of the intersection points lies at a concavity of the polygon and, if so, at step 95 sets the corresponding distance value to an arbitrarily large numerical value which is assured to be larger than the greatest distance from any remaining vertex to its corresponding intersection point, i.e., the point at which the perpendicular bisectors of the sides joined at that vertex intersect. The latter step has the effect of deferring elimination of the corresponding vertices in the step which follows at 96.

At step 96, computer 50 selects the smallest stored distance value remaining and deletes from the table the coordinates of the corresponding vertex. The original polygon is thus reconfigured to form a new polygon having n-1 vertices and n-1 sides. At step 97, computer 50 checks to determine whether only three vertices remain in the most recently reconfigured polygon. Steps 93-97 are repeated until, in accordance with the check performed at step 97, computer 50 determines that only three vertices of the original polygon remain.

When that condition is satisfied, computer 50 then calculates at step 98 the center coordinates of the circle which intersects each of the three remaining vertices. That circle corresponds to the maximum diameter circle inscribable through at least three vertices of the original polygon and is referred to herein as the maximum inscribed circle (MIC). (It should be noted that the maximum inscribed circle may overlap one or more sides of the original polygon.) The center coordinates of the MIC are then stored in memory for use in further calculations, report generation, statistical process control and/or subjected to one or more other post-processing steps indicated generally at 99.

The post-processing activity performed by computer 50 may also include displaying the MIC center coordinates or the results of any of the measurements to be described below in graphical and/or numerical form on CRT 51. However, computer 50 may also determine whether the results of individual measurements or predetermined series of measurements lie within numerical or statistical ranges previously entered into computer 50 by way of keyboard 52. Accordingly, CRT 51 may display not only the center coordinates of the MIC but also the results of any additional measurements made with reference to those coordinates and whether or not those measurements lie within user-defined limits of acceptability.

Appendix A contains a computer program listing which illustrates in detail one manner in which computer 50 may be programmed for carrying out an example of the steps 91 through 99 above in accordance with the best mode currently contemplated by the inventors for carrying out the invention. That program will be readily understood by those skilled in the art.

The manner in which computer 50 determines the center of a surface feature of an object will now be further illustrated with reference to FIGS. 3A through 3H. As noted previously, the encoder 67 of the preferred embodiment generates two hundred fifty six (256) evenly angularly spaced encoder pulses on line 68 for every complete revolution of wheel 10 so that for each surface feature of interest, computer 50 stores an array of two hundred fifty six (256) measurements representing the distance between measuring axis 36 and angularly defined locations on each surface feature of interest. While otherwise representative of an actual example, the examples illustrated in FIGS. 3A through 3J have been simplified for the sake of brevity and clarity to reflect a hypothetical case in which only nine (9) distance measurements of a surface feature are made and stored by computer 50.

Figure 3A:
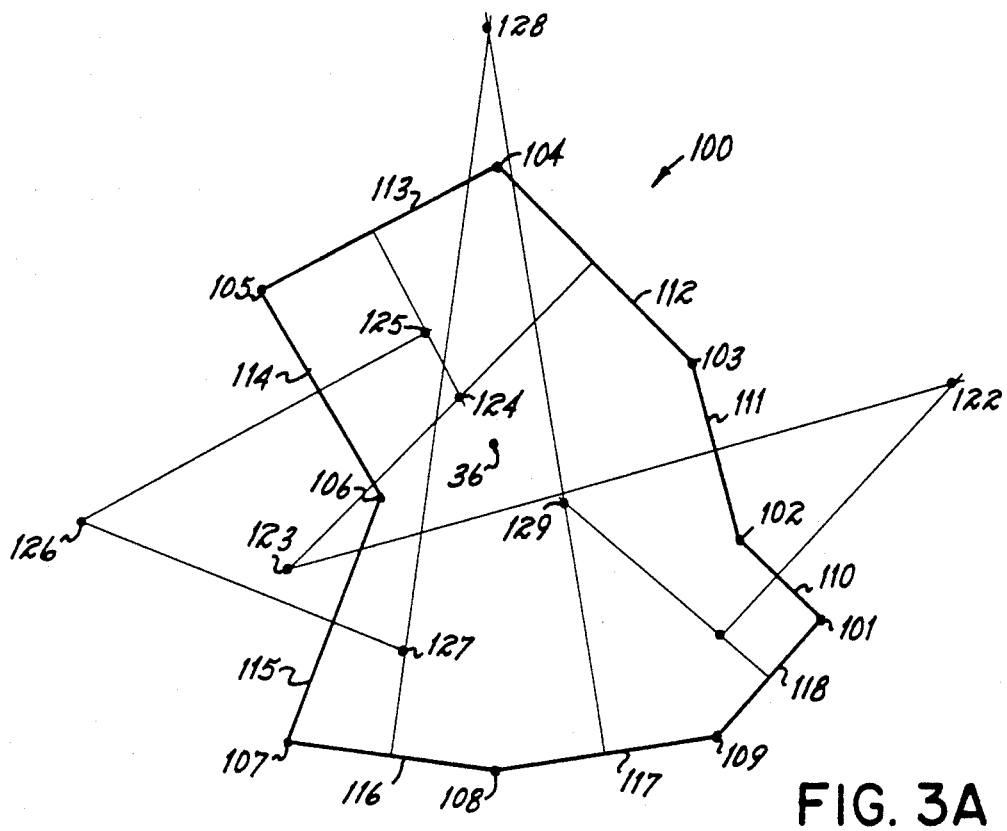
FIGS. 3A through 3H illustrate a simplified example of the manner in which the computer 50 of FIG. 1 operates to determine a center of a surface feature of an object.

Referring now to FIG. 3A, there is illustrated an initial polygon 100, the vertices, 101 through 109, of which each represent a point on a surface feature of an object, such as points on the peripheral edge 15 of the pilot hole 14 or points on the bead seat 17 of wheel 10. The vertices 101 through 109 of polygon 100 are separated by sides 110 through 118. The vertices at the opposite end of each pair of adjacent sides shall be referred to interchangeably as "endpoints" or "endpoint vertices" of those sides.

Each vertex in the series 101 through 109 corresponds to a data sample and represents the position of a point on a surface feature of interest. Computer 50 initially represents the position of each vertex in polar form denoted by a magnitude, R, correlated with the distance between the vertex and measuring axis 36 and an angle, $\theta$, measured with respect to the occurrence of the reference pulse on line 69. Computer 50 then converts each vertex representing vertices from 101-109 polar, $(R,\theta)_n$, form to Cartesian coordinate $(X,Y)_n$ form and stores same in memory in the form of a table having a row for each vertex.

From the stored coordinates of vertices 101 through 109, computer 50 calculates the coordinates of the points, 121 through 128, at which the perpendicular bisectors (shown in FIG. 3A) of each pair of adjacent sides of polygon 100 intersect. The coordinates of each of those intersection points are then stored in the aforementioned table in the same row as the vertex at which the pair of adjacent sides meet. In the present example, that table may suitably take the form of Table 1 below:

TABLE 1

| | 1 Vertex | 2 Endpoint | 3 Endpoint | 4 Perpendicular Bisector Intersection | 5 Distance |
|---|---|---|---|---|---|
| 1 | $(X,Y)_{101}$ | $(X,Y)_{109}$ | $(X,Y)_{102}$ | $(X,Y)_{121}$ | A1 |
| 2 | $(X,Y)_{107}$ | $(X,Y)_{106}$ | $(X,Y)_{108}$ | $(X,Y)_{127}$ | A7 |
| 3 | $(X,Y)_{105}$ | $(X,Y)_{104}$ | $(X,Y)_{106}$ | $(X,Y)_{125}$ | A5 |
| 4 | $(X,Y)_{104}$ | $(X,Y)_{103}$ | $(X,Y)_{105}$ | $(X,Y)_{124}$ | A4 |
| 5 | $(X,Y)_{109}$ | $(X,Y)_{108}$ | $(X,Y)_{101}$ | $(X,Y)_{129}$ | A9 |
| 6 | $(X,Y)_{103}$ | $(X,Y)_{102}$ | $(X,Y)_{104}$ | $(X,Y)_{123}$ | A3 |
| 7 | $(X,Y)_{108}$ | $(X,Y)_{107}$ | $(X,Y)_{109}$ | $(X,Y)_{128}$ | A8 |
| 8 | $(X,Y)_{102}$ | $(X,Y)_{101}$ | $(X,Y)_{103}$ | $(X,Y)_{122}$ | A2 |
| 9 | $(X,Y)_{106}$ | $(X,Y)_{105}$ | $(X,Y)_{107}$ | $(X,Y)_{126}$ | A6 |

Figure 3B:
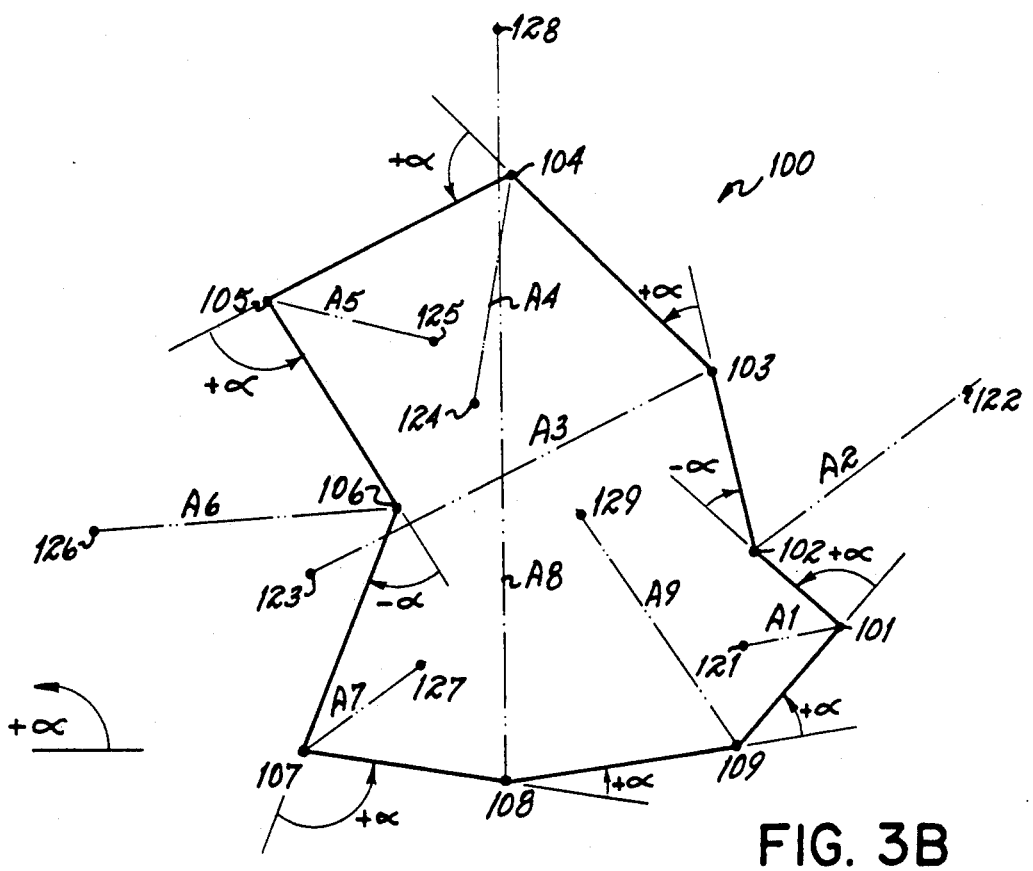

In addition to the (X,Y) coordinates of points indicated in columns 1 through 4, a series of scalar distance values, A1 through A9, which, as illustrated in FIG. 3B, represent the distance between each of the intersection points, 121 through 129, listed in column 4 and its corresponding vertex, 101 through 109, in column 1 are calculated and stored in Table 1.

Computer 50 checks to determine, which, if any, of the vertices defines a concave portion of polygon 100. To make this determination, computer 50 begins at an arbitrary one of the vertices and, proceeding in a counterclockwise direction around the polygon determines whether the angle, α, between the side clockwise of that vertex and the side counterclockwise of that vertex is either positive or negative as illustrated in FIG. 3B. Vertices associated with negative angles (−α) are those located at a concavity.

Computer 50 assigns the distance value (A1 through A9) corresponding to each vertex at a concavity an arbitrarily large value assured to be larger than the largest distance value, A1 through A9, associated with any of the remaining intersection points, 121-129. Preferably, the rows of Table 1 are arranged in ascending order of distance values so that the smallest of distances A1 through A9 is always stored in row 1 and the largest of those distance values is always stored in the last row as indicated. In the example of FIG. 3B, distances A2 and A6 are assigned such large values. After checking to be sure that more than three vertices remain in Column 1, computer 50 then selects the smallest distance value, among A1 through A9 from row 1 of Table 1 and eliminates the corresponding vertex from polygon 100. In the present example, distance A1 is the smallest of distances A1 through A9. Accordingly, computer 50 eliminates vertex 101 by deleting row 1 from Table 1 to effectively define a new polygon 130.

Figure 3C:
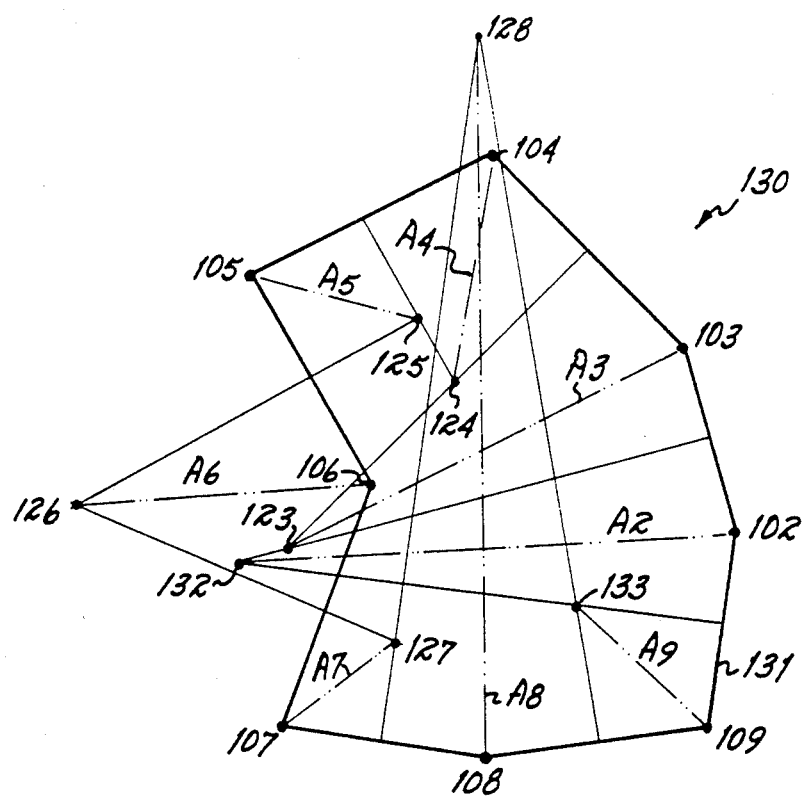

As illustrated in FIG. 3C, polygon 130 has one less side than polygon 100 and has a new side 131 and new perpendicular bisector intersection points 132 and 133. The coordinates of intersection points 132 and 133 are calculated and substituted for those of points 129 and 122, respectively in column 4 of Table 1. The distance A9, between point 133 and its corresponding vertex 109 is calculated as is the distance A2 which spans new intersection point 132 and its corresponding vertex 102. Computer 50 checks for concavities in the manner described above and assigns an arbitrarily large value to distance A6 associated with vertex 106 lying at a concavity of polygon 130. Table 1 is updated so that distance values continue to be arranged in ascending order by row. After checking to be sure that more than three vertices remain in Column 1 of Table 1 as most recently updated, computer 50 locates the smallest remaining distance value, A7, and eliminates vertex 107 by deleting row 1 to define a new polygon 135.

Figure 3D:
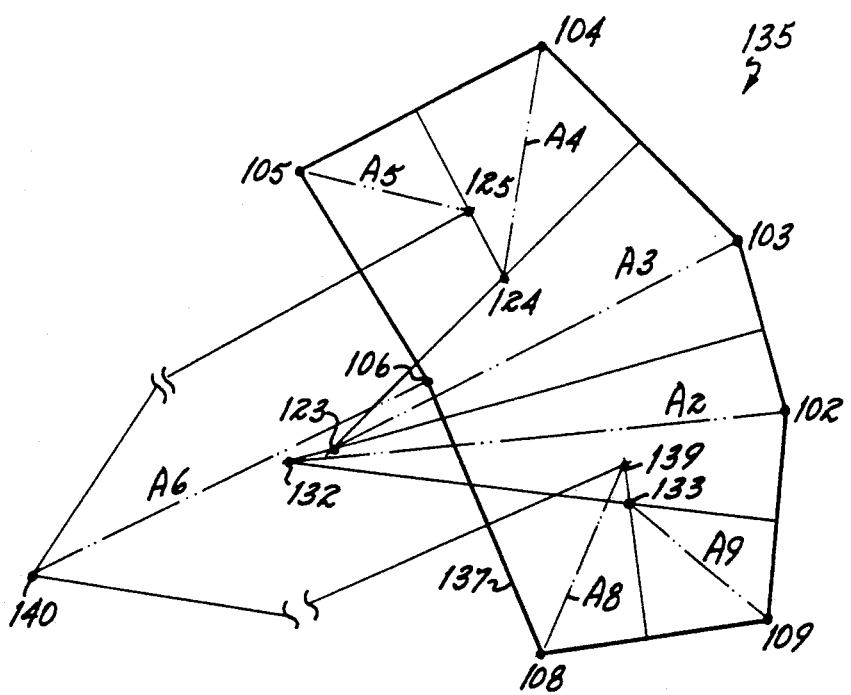

As shown in FIG. 3D, polygon 135 includes a new side 137 and two new intersection points 139 and 140 the coordinates of which are substituted for those of points 128 and 126, respectively in column 4 of Table 1 as most recently updated. Computer 50 recomputes the distances A6 and A8 and stores same. After determining that vertex 106 lies at a concavity of polygon 135, computer 50 assigns a large numerical value to A6 according to the criteria described above. Table 1 is again updated so that distance values A2, A3, A4, A5, A6, A8 and A9 are arranged in ascending order of distance by row. After checking to ensure that more than three vertices remain in Column 1, vertex 105 is eliminated by again deleting row 1 from Table 1.

Figure 3E:
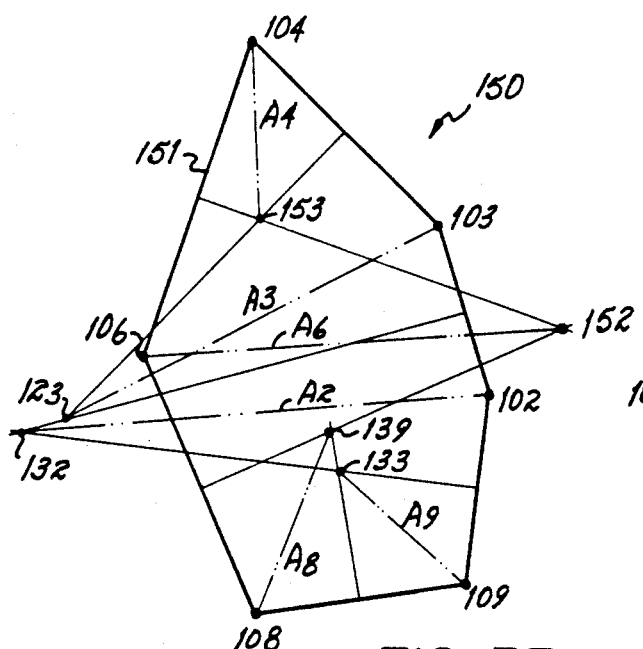

The elimination of vertex 105 produces a new polygon 150 which, as illustrated in FIG. 3E, includes a new side 151 and new perpendicular bisector intersection points 152 and 153 the latter two of which respectively replace points 124 and 140 in column 4 of Table 1 as most recently updated. Computer 50 recalculates distances A4 and A6 and stores the new distance values ascending by row in Table 1. Upon determining that no concavities are present in polygon 150, computer 50 eliminates the smallest of the remaining distance value, i.e., A9, by again eliminating row 1 of Table 1.

Figure 3G:
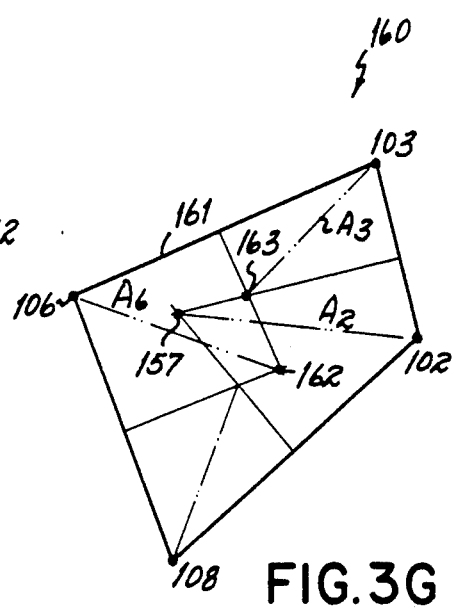
Figure 3F:
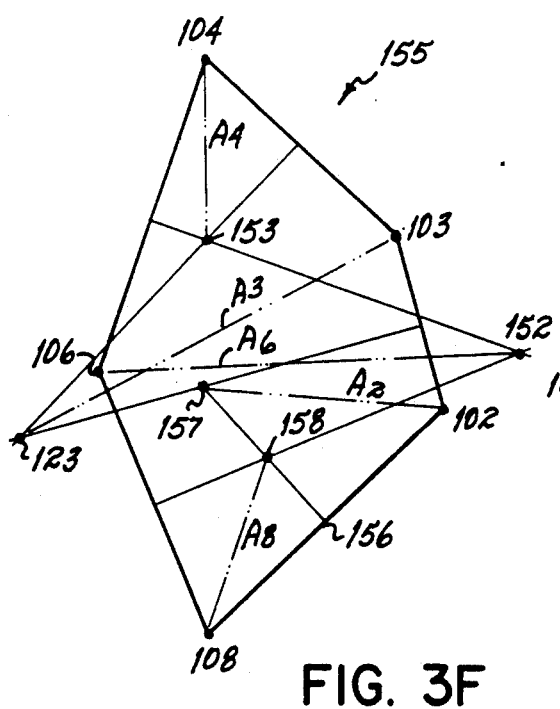

This produces a new polygon 155, which, as shown in FIG. 3F has a new side 156 and two new intersection points 157 and 158. The coordinates of points 157 are substituted for the coordinates of points 132 and 139 in column 4 of Table 1. The distances A2 and A8 are recomputed and stored in Table 1 whose rows continue to be arranged in ascending order of the remaining distance values. After finding no concavities present in polygon 155, and confirming that more than three vertices still remain in column 1, computer 50 then eliminates the vertex 104 associated with the smallest remaining distance value, i.e., A4, to produce a new polygon 160 as illustrated in FIG. 3G.

Polygon 160 has a new side 161 and two new perpendicular bisector intersection points 162, and 163. The coordinates of points 162 and 163, respectively, are substituted for the coordinates of points 152 and 123 in column 4 of Table 1 as most recently updated. Computer 50 then recalculates and stores in Table 1 in ascending order by row, the distance values A3 and A6 and after determining that no concavities exist in polygon 160, eliminates the vertex corresponding to the shortest remaining distance value. After again eliminating row 1 of Table 1 to eliminate that vertex, i.e., vertex 103, computer 50 determines that only three vertices remain.

Figure 3H:
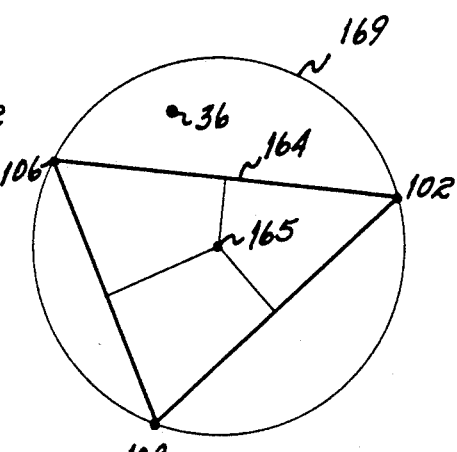
Figure 31:
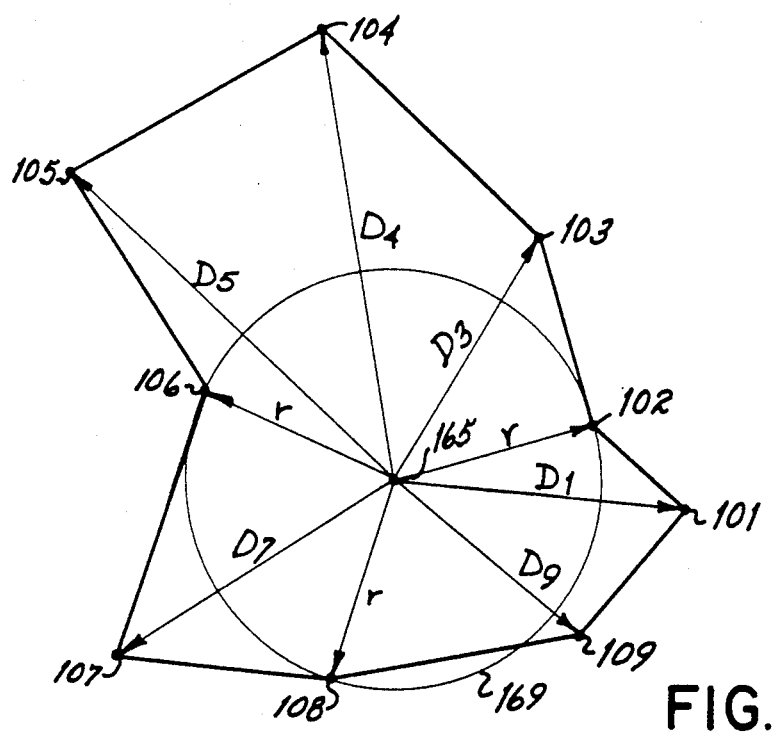

The remaining three vertices 102, 106 and 108 define a triangle 164 as shown in FIG. 3H. In order to determine the coordinates of a center 165 of the surface feature represented by the original polygon 100 shown in FIG. 3A, computer 50 calculates the center coordinates of the circle, 169 having the remaining three vertices 102, 106 and 108 in common. The center coordinates of circle 169 correspond to the desired center coordinates of the surface feature of interest.

It so happens that circle 169 also approximates the maximum inscribed circle (MIC) associated with the surface feature. Those center coordinates may then be stored for use in report generation and/or displayed on CRT 51. The center coordinates 165 and/or the coordinates of the vertices 102, 106 and 108 lying on MIC 169 may also be stored for making other measurements such as those to be described below.

Making Centered Measurements of an Uncentered Object

An important aspect of the invention makes it possible to make centered measurements of a surface feature of an object without mechanically centering the object on a measuring reference. For example, machine 9 can carry out measurements of one surface feature, such as bead seat 17, with respect to the center of another surface feature, such as the center of pilot 14, without requiring pilot 14 to be physically located on center with measuring axis 36 as will now be described with additional reference to FIG. 3J.

In the manner described in further detail below, wheel 10 is clamped in place on machine 9 between pads 31 and 47 in fixed relation to measuring axis 36 but without concern for precisely centering wheel 10 on axis 36. Wheel 10 is then rotated about axis 36 while probe 77 contacts a first surface feature such as inside edge 15 of pilot 14 causing LVDT 80 to generate a signal on line 82 related to the distance between edge 15 and axis 36. Computer 50 samples the distance signal from line 82 to generate and store a first series of data samples, each sample therein being correlated to the angle and distance between axis 36 and one of a corresponding series of angularly spaced points 101 through 109 located on edge 15.

Preferably during the same rotation of wheel 10, probe 72 contacts a second surface feature such as bead seat 17 to generate on line 74 a distance signal related to the distance between bead seat 17 and axis 36. Computer 50 samples line 74 to generate and store a second series of data samples, each sample therein being correlated to the angle and distance between axis 36 and one of a series of angularly spaced points 171 through 179 on bead seat 17. The angular position of each data sample in the second series corresponds to that of a data sample in the first series and vice versa. For each data sample in the second series, computer 50 calculates and stores the coordinates of each corresponding point 171 through 179 on bead seat 17 in cartesian coordinate form.

Figure 3J:
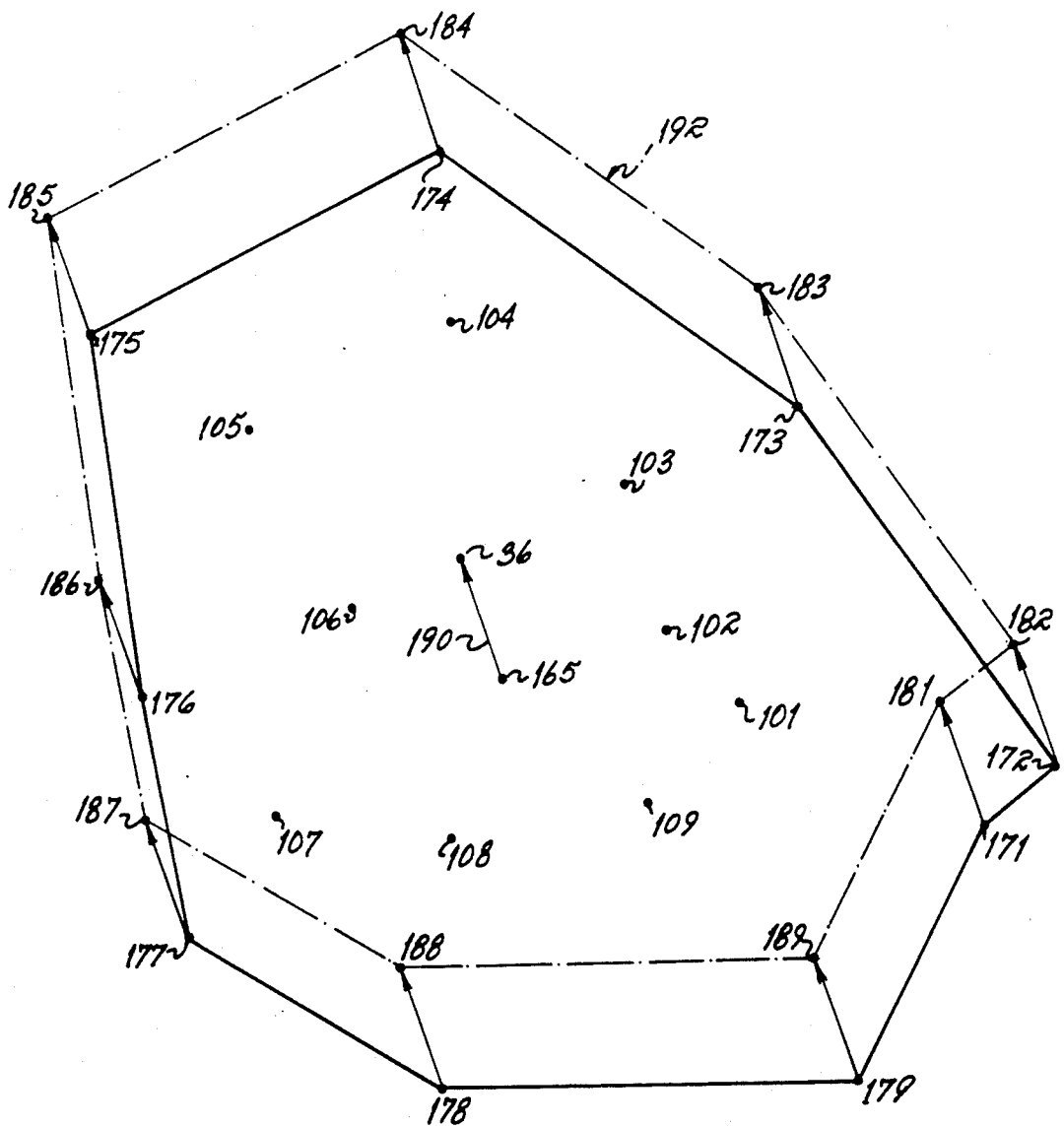
FIG. 3J illustrates the steps in addition to those of FIGS. 3A through 3H carried out by the computer 50 of FIG. 1 in order to make a centered measurement of an uncentered object.

Using any suitable method, computer 50 then determines the center coordinates of the first surface feature, i.e., pilot 14. While this could be accomplished for example by determining the center of a circle (or other locus depending on the nominal shape of the first surface feature), computer 50 preferably determines the maximum inscribed circle (MIC) of the points 101 through 109 represented by the first series of data samples and finds the coordinates 165 of the center of that MIC in the manner described above. Those coordinates represent the position of the center 165 of pilot 14 with respect to axis 36 a indicated by vector 190 as shown. Computer 50 then shifts the coordinates of each point 171 through 179 represented by the second series of data samples in accordance with the magnitude and angle of vector 190 as shown in FIG. 3J to generate a coordinate-corrected representation 192 of the second series of data samples consisting of new points 181 through 189.

The coordinate-corrected representation 192 accurately represents the positions of points on bead seat 17 with respect to the center of pilot 14. Thus, the coordinate-corrected representation is equivalent to a measurement of bead seat 17 taken on center with pilot 14 and can be used to derive various measurement figures of merit. For example, in order to determine the eccentricity of bead seat 17 with respect to pilot 14, computer 50 calculates the first harmonic of the coordinate-corrected representation. In order to calculate the runout of bead seat 17, computer 50 calculates the distance between the point in the coordinate-corrected representation most distant from the center of pilot 14 to the point therein closest to the center of pilot 14.

While foregoing aspect of the invention has been described with reference to the machine 9 of the preferred embodiment which utilizes digital sampling of distance indicating signals, those skilled in the art will appreciate that its principles may be equivalently applied to analog measuring systems. To do so, a coordinate-corrected representation of an analog signal originally representing the distance between a surface feature locus and a measuring axis would be generated by adjusting the magnitude and phase of the analog signal in accordance with a signal representing the positional offset between the measuring axis and the center of another surface feature.

Measuring the Effective Size of a Surface Feature

After finding the center of a surface feature by finding its MIC in the manner described above, the effective size of that surface feature may readily be calculated by computer 50. To do so, computer 50 calculates the diameter of MIC 169. That diameter, which corresponds to the desired effective size value, equals twice the distance from center 165 to any of vertices 102, 106 or 108. Upon completing its calculation, the effective size value may be stored, displayed and/or compared with user-selectable tolerance limits previously entered into the memory of computer 50 by way of keyboard 52. The result of such comparison may also be stored, displayed and/or otherwise utilized. For example, if the effective size value computed falls outside the aforementioned tolerance limits, computer 50 can generate an audible signal to alert the operator of machine 9.

Measuring the Out-of-Roundness of a Surface Feature

To measure the out-of-roundness of a surface feature as will now be described with reference to FIG. 3I, computer 50 first determines the center 165 of the maximum inscribed circle (MIC) 169 after identifying at least three vertices, i.e. 102, 106 and 108 lying thereon in the manner described above. With this information, computer 50 then calculates the radius, r of MIC 169 in accordance with the distance between the coordinates of center 165 and the coordinates of any of the points 102, 106 or 108 lying on MIC 169. Computer 50 then calculates the distances, D1, D3, D4, D5, D7 and D9 between center 165 and each of the remaining vertices 101, 103, 104, 105, 107 and 109 and determines the maximum distance, i.e. D4, of those distances. Computer 50 then subtracts the radius value, r, from the maximum distance to arrive at a measurement figure.

To carry out the above steps, computer 50 executes the instructions for determining the radius of the MIC 169, as set forth in Appendix A then:

```
max : = -9999.9; {init to "small" number}
for i : = 1 to n points do begin
    dist_to_point : = sqrt(
        sqrt(pt[i].x - mic:center:x) +
        sqrt(pt[i].y - mic:center:y)). -
        mic radius;
    if dist_to_point > max_then
        max : = dist_to_point;
end;
{max is the result}.
```

Measuring the Total Indicated Runout (TIR) of a Surface Feature

The total indicated runout (TIR) of a surface feature of an object may be calculated by computer 50 after determining the center 165 of MIC 169. To do so, computer 50 calculates the maximum distance from any of the vertices 101 through 109 as well as the minimum distance from center 169 to any of those same vertices. The total indicated runout (TIR) value is then determined by subtracting that minimum distance from that maximum distance.

Measuring the Eccentricity Between First and Second Surface Features of an Object To measure the eccentricity between two surface features of an object, for example the eccentricity between the bead seat 17 and the pilot hole 14 of wheel 10, computer 50 first determines the center coordinates of each respective surface feature separately in the manner described in detail above. It is important to note that the invention permits the distance measurement data for each surface feature to be acquired simultaneously. For example, as wheel 10 undergoes one revolution, computer 50 can acquire from line 74 and store a series of data samples indicating the distance from axis 36 to bead seat 17 at a series of equiangularly spaced points. At the same time, computer 50 can acquire via line 82, a corresponding series of data samples indicating the distance from axis 36 to a series of points around the edge 15 of pilot hole 14 and also gather angle data from encode 67 by way of lines 68 and 69. To measure the eccentricity between the two surface features, computer 50 calculates the distance between the coordinates of those centers.

Determining the Center of a First Surface Feature of an Object and Measuring the Total Indicated Runout (TIR) of a Second Surface Feature with Reference to that Center The center of the first surface feature, e.g. pilot hole 14, is determined in the manner described in detail above and stored. The distance between the second surface, e.g. bead seat 17, feature and a reference fixed with respect to measuring axis 36 is then measured by the probe 72 at a plurality of equiangularly spaced points. Computer 50 samples and stores a plurality of data samples representing the vertices of a polygon in polar form and converts the coordinates of each vertex to Cartesian coordinate form as described above. Computer 50 then calculates the distance from the center coordinates of the first surface feature to each of the vertices and finds the maximum and minimum distance values among those distances. The TIR between the second surface feature and the center of the first surface feature is then calculated as the difference between those maximum and minimum distances.

While the apparatus and methods described above constitute preferred embodiments of the invention, it is to be understood that the invention is not limited to same since, as those skilled in the art will readily recognize in light of the present disclosure, changes can be made thereto without departing from the scope of the invention as particularly pointed out and distinctly claimed in the appended claims.

APPENDIX A

```
program rim7;
(define Looping)
($define PlotVees)
(define Timing)
(define TestCGA)
uses DOS, CRT, Graph;

const
    MinAng = 5;
    EncoderMax = 255;
    Gain = 50;
type
    float = double;
    point = record
        x : float;
        y : float;
    end;
    LIPoint = record
        x : Longint;
        y : Longint;
    end;
    circletype = record
        Center : point;
        Radius : float;
    end;
```

```
    TreeElPtr = ^TreeEl;
    TreeEl = record
        prev : TreeElPtr;
        next : TreeElPtr;
        left : integer;
        center : integer;
        right : integer;
        mid : point;
        height : float;
        leftmp : point;
        rightmp : point;
      end;
    Sample = 0..EncoderMax;
    SampleArray = Array[Sample] of float;
    XYArray = Array[Sample] of point;
    XYIArray = Array[Sample] of LIPoint;
const
    truecircle : circletype = (center : (x : 0.0; y : 0.0); radius : 7.00);
    Two32 : float = 4294967296.0;
var
    Ticks :      Word absolute $40:$6C;
    CRTScreen : byte absolute $B800:0;
    StartTime : Word;
    Probe :      SampleArray;
    RawPoints : XYArray;
    TestPoints: XYIArray;
    MIC :        CircleType;
    StdOut :     text;
    TIR :        float;
    AMP:         array[1..4] of float;
    PHAS:        array[1..4] of float;
    MINLOC:      array[0..2] of integer;
    FNAME:       PathStr;
    CircleCount : longint;
    TestCount : longint;
    FirstPass : boolean;
    Drawit    : boolean;
    SaveText :  Array[0..3999] of byte;
    SaveX :     byte;
    SaveY :     byte;
    PolyCount : integer;
    Root : TreeElPtr;
    Tree : array[Sample] of TreeEl;
    GraphDriver : integer;
    GraphMode : integer;
    ErrorCode : integer;
    XMin, YMin, XMax, YMax, XCenter, YCenter, XGain, YGain : integer;
    WXMax, WXMin, WYMax, WYMin : float;
    XOffset, XFGain, YOffset, YFGain : float;
    SortTicks, ReSortTicks, ReduceTicks, ThPTTicks, At2Ticks : word;
type
    str16 = string[16];

Function IntToStr(i,f : integer) : str16;
var
    s : str16;
begin
    Str(i:f,s);
    IntToStr := s;
end;

Function FloatToStr(x : float; f,d : integer) : str16;
var
    s : str16;
begin
    Str(x:f:d,s);
    floatToStr := s;
end;

{$L Unhook.obj}
procedure Unhook(t : TreeElPtr); external;
```

```
function TreeIsSorted : boolean;
var
  t : TreeElPtr;
  h : float;
  sorted : boolean;
begin
  sorted := true;
  t := root;
  h := t^.height;
  while t <> nil do begin
    if h > t^.height then sorted := false;
    h := t^.height;
    t := t^.next;
  end;
  TreeIsSorted := sorted;
end;

function InTree(n : integer) : boolean;
var
  t : TreeElPtr;
  target, pred : TreeElPtr;
  found : boolean;
begin
  t := root;
  target := @Tree[n];
  found := false;
  while t <> nil do begin
    if t = target then
      found := true;
    pred := t;
    t := t^.next;
  end;
  InTree := found;
end;

procedure PrtScr;
var
    Reg: registers;
begin
    Intr($5,Reg)
end;

procedure SaveTextScreen;
begin
  move(CRTScreen,SaveText,4000);
  SaveX := wherex;
  SaveY := wherey;
end;

procedure RestoreTextScreen;
begin
  Move(SaveText,CRTScreen,4000);
  GotoXY(SaveX,SaveY);
end;

Procedure InitGraphics;
var
  XAsp, YAsp : word;
  R, Range : float;
  GraphError : integer;
  EString : string;
begin
  SaveTextScreen;
  if GraphMode = 2020 then begin
{$ifdef TestCGA}
    GraphDriver := CGA;
    GraphMode := CGAHi;
{$else}
    GraphDriver := Detect;
{$endif}
    InitGraph(GraphDriver, GraphMode, 'c:\tp');
    GraphError := GraphResult;
    estring := GraphErrorMsg(GraphError);
    XMax := GetMaxX;
```

```
    YMax := GetMaxY;
    YMin := 0;
    XMin := 160;
    GetAspectRatio(XAsp, YAsp);
    YGain := YMax-YMin-8;
    XGain := (Longint(YGain) * YAsp) div Xasp;
(   XGain := 635-165;)
(   YGain := (Longint(XGain) * XAsp) div Yasp;)
    XCenter := (XMin+XMax) div 2;
(   YCenter := Longint(YGain)*(Ymin+Ymax) div (2*XGain);)
    YCenter := (Ymin+YMax) div 2;
  end else SetGraphMode(GraphMode);
  Range := WXMax;
  if -WXMin > Range then Range := -WXMin;
  if WYMax > Range then Range := WYMax;
  if -WYMin > Range then Range := -WYMin;
  Range := 2.0 * Range;
  XOffset := XCenter(-XGain*(WXMax+WXMin)/(2.0*Range));
  XFGain := XGain/Range;
  YOffset := YCenter(-YGain*(WYMax+WYMin)/(2.0*Range));
  YFGain := YGain/Range;
end;

function UnGain(x : float) : float;
begin
  UnGain := (x-7.0)/gain+7.0;
end;

procedure PolarToXY(var p : SampleArray; var r : XYArray);
var
  i : integer;
  angle : float;
begin
  WXMax := -9999.9;
  WXMin := 9999.9;
  WYMax := -9999.9;
  WYMin := 9999.9;
  for i := 0 to EncoderMax do begin
    angle := i * pi / 128.0;
    R[i].x := P[i] * Cos(angle);
    R[i].y := P[i] * Sin(angle);
    if R[i].x > WXMax then WXMax := R[i].x;
    if R[i].x < WXMin then WXMin := R[i].x;
    if R[i].y > WYMax then WYMax := R[i].y;
    if R[i].y < WYMin then WYMin := R[i].y;
  end;
end;

Function GetWheel : boolean;
var
  ProbeFile : text;
  i : integer;
begin
  if ParamCount = 0 then begin
    write('Enter the name of the data file to be analyzed: ');
        readln(FName);
  end else if FirstPass then FName := ParamStr(1)
  else FName := '';

FirstPass := false;
  if FName = '' then GetWheel := false
  else begin
    assign(ProbeFile,FName);
    reset(ProbeFile);
    for i := 0 to EncoderMax do begin
         read(ProbeFile,Probe[i]);
                Probe[i] := Gain * Probe[i] + 7.0;
    end;
    Close(ProbeFile);
        PolyCount := 256;
         PolarToXY(Probe,RawPoints);
       end;
     end;
```

```
function ToGraphX(x : float) : integer;
begin
   ToGraphX := round(XOffset + XFGain * X);
end;

function ToGraphY(y : float) : integer;
begin
   ToGraphY := round(YOffset - YFGain * y);
end;

Procedure Screen;
begin
   MoveTo(Xmin,Ymin);
   LineTo(XMax,YMin);
         LineTo(XMax,YMax);
         LineTo(XMin,YMax);
         LineTo(XMin,YMin);
   MoveTo(round(XOffset),YMin);
   LineTo(round(XOffset),YMax);
         MoveTo(XMin,round(YOffset));
   LineTo(XMax,round(YOffset));
end;

Function Runout(var p : SampleArray) : float;
var
        Hi,Lo: float;
   i : integer;
begin
        Hi := -9999.9;
        Lo := 9999.9;
        for i := 0 to EncoderMax do begin
                if (Probe[i] < Lo) then Lo := Probe[i];
                if (Probe[i] > Hi) then Hi := Probe[i];
        end;
        Runout := Hi - Lo;
end;

function ATan2 (Y,X: float) : float;
var
   Ang: float;
begin
($ifdef timing)($R-)
  At2Ticks := At2Ticks-Ticks;
($R+)($endif)
   if X = 0.0 then begin
     if y >= 0.0 then Atan2 := pi/2.0
     else ATan2 := 1.5 * pi;
   end else if X < 0.0 then ATan2 := arctan(Y/X)+pi
   else ATan2 := arctan (Y/X);
($ifdef timing)($R-)
  At2Ticks := At2Ticks+Ticks;
($R+)($endif)
end;
procedure FOURIER(NFREQ: integer);
var
  CSUM,SSUM,ANG: float;
  HARM: integer;
  i : integer;
begin
  for HARM := 1 to NFREQ do begin
    CSUM := 0;
    SSUM := 0;
    for I := 0 to EncoderMax do begin
      ANG := I*PI/128 * HARM;
      SSUM := SSUM + PROBE[I] * sin(ANG);
      CSUM := CSUM + PROBE[I] * cos(ANG);
    end;
    AMP[HARM] := (sqrt(sqr(SSUM) + sqr(CSUM)))/128;
    ANG := atan2(SSUM,CSUM);
    PHAS[HARM] := (ANG*180)/PI;
    if PHAS[HARM] < 0 then PHAS[HARM] := PHAS[HARM] + 360.0;
```

```
    PHAS[HARM] := PHAS[HARM]/HARM;
  end;
end;

procedure EXTRACT(NFREQ: integer);
var
  SUM,ANG: float;
  i : integer;
begin
  for I := 0 to EncoderMax do begin
    ANG := I*PI/128 * NFREQ;
    Probe[I] := Probe[i]-AMP[NFREQ]*cos(ANG-PHAS[NFREQ]*PI/180);
  end;
end;

procedure PlotCircle(c: circletype);
begin
  Circle(ToGraphX(c.center.x),ToGraphY(c.center.y),round(c.radius*XFgain));
end;

procedure PlotPoint(p : point; color : integer);
var
  i, j, ix, iy : integer;
begin
  ix := ToGraphX(p.x);
  iy := ToGraphY(p.y);
  for i := ix-1 to ix+1 do for j := iy-1 to iy+1 do
    if (i<>ix) or (j<>iy) then PutPixel(i,j,color);
end;

Procedure PlotVee(t : TreeEl);
var
  PlotRec : array[1..4] of record
              x : word;
              y : word;
            end;
begin
{$ifdef PlotVees}
  with t do begin
    PlotRec[1].x := ToGraphX(leftmp.x);
    PlotRec[1].y := ToGraphY(leftmp.y);
    PlotRec[2].x := ToGraphX(mid.x);
    PlotRec[2].y := ToGraphY(mid.y);
    PlotRec[3].x := ToGraphX(rightmp.x);
    PlotRec[3].y := ToGraphY(rightmp.y);
  end;
  DrawPoly(3,PlotRec);
{$endif}
end;

procedure PlotData(var R : XYArray);
var
  plotrec : array[0..256] of record
      ix : word;
      iy : word;
    end;
  i : integer;
begin
  for i := 0 to PolyCount-1 do with R[i], PlotRec[i] do begin
    ix := ToGraphX(x);
    iy := ToGraphY(y);
  end;
  PlotRec[PolyCount] := PlotRec[0];
  DrawPoly(PolyCount+1,PlotRec);
end;

procedure ThreePointCircle(p1,p2,p3 : point; var cc : circletype);
var
  a, b, c : float;
  s : float;
  mp12, mp23 : float;
  x12, x23, y12, y23 : float;
```

```
begin
  inc(circlecount);
( Determine the Radius of the circle...no longer used; this is the hard way.
{ a := sqrt(sqr(p1.x-p2.x) + sqr(p1.y-p2.y));
  b := sqrt(sqr(p2.x-p3.x) + sqr(p2.y-p3.y));
  c := sqrt(sqr(p3.x-p1.x) + sqr(p3.y-p1.y));
  s := (a+b+c)/2.0;
  CC.Radius := a*b*c/(4*sqrt(s*(s-a)*(s-b)*(s-c)));
}
{ Now, determine the center by finding where two perpendicular bisectors meet
  if p2.y = p1.y then begin
    mp23 := (p2.x-p3.x)/(p3.y-p2.y);
    x23 := (p2.x+p3.x)/2.0;
    y23 := (p2.y+p3.y)/2.0;
    CC.Center.x := (p1.x+p2.x)/2.0;
    CC.Center.y := mp23*(CC.Center.x-x23)+y23;
  end else if p3.y = p2.y then begin
    mp12 := (p1.x-p2.x)/(p2.y-p1.y);
    x12 := (p1.x+p2.x)/2.0;
    y12 := (p1.y+p2.y)/2.0;
    CC.Center.x := (p2.x+p3.x)/2.0;
    CC.Center.y := mp12*(CC.Center.x-x12)+y12;
  end else begin
    mp12 := (p1.x-p2.x)/(p2.y-p1.y);              (-1.0/m)
    mp23 := (p2.x-p3.x)/(p3.y-p2.y);
    x12 := (p1.x+p2.x)/2.0;
    y12 := (p1.y+p2.y)/2.0;
    x23 := (p2.x+p3.x)/2.0;
    y23 := (p2.y+p3.y)/2.0;
    CC.Center.x := (y23-y12+mp12*x12-mp23*x23)/(mp12-mp23);
    CC.Center.y := mp12*(CC.Center.x-x12)+y12;
  end;
  (Get the radius the easy way...distance from center to any point)
  CC.Radius := Sqrt(sqr(CC.Center.x-p1.x)+sqr(CC.Center.y-p1.y));
end;

procedure ThreePointTree(var t : TreeEl; assignmp : boolean);
var
  p1,p2,p3 : point;
  mp12, mp23 : float;
  q12, q23 : point;
  dx21, dy21, dx32, dy32 : float;
{ b1, b2 : float;}
  angle : float;
  sgn : integer;
begin
  with t do begin
(Get the Point Values)
    p1 := RawPoints[left];
    p2 := RawPoints[center];
    p3 := RawPoints[right];
(The easy part...find the midpoints of the two segments)
    q12.x := (p1.x+p2.x)/2.0;
    q12.y := (p1.y+p2.y)/2.0;
    q23.x := (p2.x+p3.x)/2.0;
    q23.y := (p2.y+p3.y)/2.0;
    if AssignMp then begin
      leftmp := q12;
      rightmp := q23;
    end;
(Calculate some common variables)
    dx21 := p2.x-p1.x;
    dy21 := p2.y-p1.y;
    dx32 := p3.x-p2.x;
    dy32 := p3.y-p2.y;
{ Now, find where the two perpendicular bisectors meet }
    if p2.y = p1.y then begin
      mp23 := -dx32/dy32;                    ((p2.x-p3.x)/(p3.y-p2.y);)
      mid.x := q12.x;                        ((p1.x+p2.x)/2.0;)
      mid.y := mp23*(mid.x-q23.x)+q23.y;
    end else if p3.y = p2.y then begin
      mp12 := -dx21/dy21;                    ((p1.x-p2.x)/(p2.y-p1.y);)
      mid.x := q23.x;                        ((p2.x+p3.x)/2.0;)
      mid.y := mp12*(mid.x-q12.x)+q12.y;
```

```
    end else begin
      mp12 := -dx21/dy21;                ((p1.x-p2.x)/(p2.y-p1.y);)
      mp23 := -dx32/dy32;                ((p2.x-p3.x)/(p3.y-p2.y);)
      mid.x := (q23.y-q12.y+mp12*q12.x-mp23*q23.x)/(mp12-mp23);
      mid.y := mp12*(mid.x-q12.x)+q12.y;
    end;
(   angle := ATan2(dy32,dx32)-ATan2(dy21,dx21);
    if angle < -pi then angle := angle + 2.0*pi;
    if angle > pi then angle := angle - 2.0*pi;)

if dy32 > 0 then sgn := 1 else sgn := -1;
    if dx21*sgn+dy21*sgn*mp23 > 0 then
 (Get the height...distance from center to any point)
(    if angle > 0 then)
     height := sqr(mid.x-p2.x)+sqr(mid.y-p2.y) (was sqrt)
       else height := 9999.9;
    end;
  end;

($L resort3.obj)
  procedure resort(tm, um : TreeElPtr); external;

procedure BuildTree;
  var
    i,j : integer;
  begin
    SetColor(lightCyan);
    with Tree[0] do begin
      root := @Tree[0];
      left := (PolyCount-1);
      center := 0;
      right := (1) mod PolyCount;
      prev := nil;
      next := nil;
  ($ifdef timing)($R-)
      ThPTTicks := ThPTTicks-Ticks;
  ($R+)($endif)
      ThreePointTree(Tree[0],true);
  ($ifdef timing)($R-)
      ThPTTicks := ThPTTicks+Ticks;
  ($R+)($endif)
    end;
    i := 1;
    for j := 1 to 127(PolyCount-1) do begin
      with Tree[i] do begin
        left := (i-1);
        center := i;
        right := (i+1) mod PolyCount;
  ($ifdef timing)($R-)
        ThPTTicks := ThPTTicks-Ticks;
  ($R+)($endif)
        ThreePointTree(Tree[i],true);
  ($ifdef timing)($R-)
        ThPTTicks := ThPTTicks+Ticks;
  ($R+)($endif)
      end;
      i := i + 1;
      with Tree[i] do begin
        left := (i-1);
        center := i;
        right := (i+1) mod PolyCount;
  ($ifdef timing)($R-)
        ThPTTicks := ThPTTicks-Ticks;
  ($R+)($endif)
        ThreePointTree(Tree[i],true);
  ($ifdef timing)($R-)
        ThPTTicks := ThPTTicks+Ticks;
  ($R+)($endif)
      end;
  ($ifdef timing)($R-)
      SortTicks := SortTicks-Ticks;
  ($R+)($endif)
      Resort(@Tree[i-1],@Tree[i]);
  ($ifdef timing)($R-)
      SortTicks := SortTicks+Ticks;
```

```
($R+)($endif)
    i := i + 1;
  end;
  Unhook(@Tree[254]);
  with Tree[255] do begin
    left := 254;
    center := i;
    right := 0;
($ifdef timing)($R-)
    ThPTTicks := ThPTTicks-Ticks;
($R+)($endif)
    ThreePointTree(Tree[i],true);
($ifdef timing)($R-)
    ThPTTicks := ThPTTicks+Ticks;
($R+)($endif)
($ifdef timing)($R-)
    SortTicks := SortTicks-Ticks;
($R+)($endif)
    Resort(@tree[254],@tree[255]);
  end;
($ifdef timing)($R-)
  SortTicks := SortTicks+Ticks;
($R+)($endif)
end;

procedure CheckTree;
var
  t, u : TreeElPtr;
  c : integer;
  h : float;
  ec : integer;
  intree : set of 0..255;
begin
  ec := 0;
  h := 0.0;
  t := root;
  u := nil;
  c := 0;
  intree := [];
  while (t^.next <> nil) and (c<300) do begin
    if t^.center <> 999 then begin
      if t^.center in intree then
        ec := ec + 1;
      intree := intree + [t^.center];
    end;
    if (t^.prev <> nil) and (t^.prev^.next <> t) then
      ec := ec + 1;
    if (t^.next <> nil) and (t^.next^.prev <> t) then
      ec := ec + 1;
    if t^.prev <> u then
      ec := ec + 1;
    if t^.height < h then
      ec := ec + 1;
    if Tree[t^.left].center = 999 then
      ec := ec + 1;
    if Tree[t^.right].center = 999 then
      ec := ec + 1;
    h := t^.height;
    u := t;
    t := t^.next;

c := c + 1;
  end;
  if c >= 300 then
    ec := ec + 1;
  c := 0;
  while (t^.prev <> nil) and (c<300) do begin
    t := t^.prev;
    c := c + 1;
  end;
  if c > 300 then
    ec := ec + 1;
end;
```

```
procedure CheckLinks;
var
  t,u : TreeElPtr;
  c : integer;
  h : float;
  ec : integer;
  intree : set of 0..255;
begin
  ec := 0;
  h := 0.0;
  t := root;
  u := nil;
  c := 0;
  intree := [];
  while (t^.next <> nil) and (c<300) do begin
    if t^.center <> 999 then begin
      if t^.center in intree then
        ec := ec + 1;
      intree := intree + [t^.center];
    end;
    if t^.prev <> u then
      ec := ec + 1;
    if Tree[t^.left].center = 999 then
      ec := ec + 1;
    if Tree[t^.right].center = 999 then
      ec := ec + 1;
    u := t;
    t := t^.next;
    c := c + 1;
  end;
  if c >= 300 then
    ec := ec + 1;
  c := 0;
  while (t^.prev <> nil) and (c<300) do begin
    t := t^.prev;
    c := c + 1;
  end;
  if c > 300 then
    ec := ec + 1;
end;

procedure reduce(lastflag : boolean);
var
  j, k : integer;
  t : TreeElPtr;
  q12, q23 : point;
begin {$ifdef timing}{$R-}
  ReduceTicks := ReduceTicks-ticks+ThPTTicks+ReSortTicks;
{$R+}{$endif}
  t := root;
  Unhook(t);
  t^.center := 999;  (marker...not in remaining tree)
{$ifdef PlotVees}
  PlotVee(t^);
{$endif}
  j := t^.left;
  Unhook(@Tree[j]);
  k := t^.right;
  Unhook(@Tree[k]);
  Tree[j].right := k;
  Tree[k].left := j;
  with Tree[j] do begin
    rightmp := t^.mid;
{$ifdef timing}{$R-}
    ThPTTicks := ThPTTicks-Ticks;
{$R+}{$endif}
    ThreePointTree(Tree[j],false);
{$ifdef timing}{$R-}
    ThPTTicks := ThPTTicks+Ticks;
```

```
{$R+}{$endif}
      if lastflag then begin
        SetColor(lightMagenta);
{$ifdef PlotVees}
        PlotVee(Tree[j]);
{$endif}
      end;
    end;
   with Tree[k] do begin
     leftmp := t^.mid;
{$ifdef timing}{$R-}
     ThPTTicks := ThPTTicks-Ticks;
{$R+}{$endif}
     ThreePointTree(Tree[k],false);
{$ifdef timing}{$R-}
     ThPTTicks := ThPTTicks+Ticks;
{$R+}{$endif}
{$ifdef PlotVees}
     if lastflag then PlotVee(Tree[k]);
{$endif}
   end;
{$ifdef timing}{$R-}
  ReSortTicks := ReSortTicks-Ticks;
{$R+}{$endif}
  ReSort(@Tree[j],@Tree[k]);
{$ifdef timing}{$R-}
  ReSortTicks := ReSortTicks+Ticks;
  ReduceTicks := ReduceTicks+Ticks-ThPTTicks-ReSortTicks;
{$R+}{$endif}
end;

function CheckIC(c : circletype; shift : integer) : integer;
var
  Count : integer;
  R2 : float;
  i, j : integer;
begin
  Count := 0;
  R2 := sqr(c.Radius-0.0005);
  for i := 0 to EncoderMax shr shift do begin
    j := i shl shift;
    if sqr(c.Center.x-RawPoints[j].x) + sqr(c.Center.y-RawPoints[j].y) >= R2
    then inc(Count);
  end;
  CheckIC := Count;
end;

{Main Program}
var
  rep : integer;
  i : integer;
  George : boolean;
  hold : word;
  HarmCircle : circletype;
begin
  SortTicks := 0;
  ReSortTicks := 0;
  ReduceTicks := 0;
  ThPTTicks := 0;
  AT2Ticks := 0;
  GraphMode := 2020;
  FirstPass := true;
  FName := '';
  TIR := 9.999;
  Amp[1] := 9.999;
  Phas[1] := 999;
  Assign(StdOut,'');
  Rewrite(StdOut);
```

```
   while GetWheel do begin
      InitGraphics;
      SetColor(DarkGray);
      SCREEN;
      PlotCircle(truecircle);
      SetColor(Cyan);
      Drawit := true;
      StartTime := Ticks;
($ifdef looping)
for rep := 1 to 100 do begin
($endif)
      TIR := Runout(Probe);
      Hold := At2Ticks;
      FOURIER(1);
      At2Ticks := Hold;
{   EXTRACT(1);}
      SetLineStyle(SolidLn,0,NormWidth);
      if Drawit then PlotData(RawPoints);
      BuildTree;
($ifdef timing)($R-)
      SortTicks := SortTicks-Ticks;
($R+)($endif)
($ifdef timing)($R-)
      SortTicks := SortTicks+Ticks;
($R+)($endif)
      for i := 1 to PolyCount-4 do begin
        SetColor(Green);
        Reduce(false);
      end;
      Reduce(true);
      with root^ do
        ThreePointCircle(RawPoints[center],
                    RawPoints[left],
                    RawPoints[right],
                    MIC);
      if Drawit then begin
        PlotCircle(MIC);
        PlotPoint(MIC.Center,LightRed);
        with root^ do begin
          PlotPoint(RawPoints[left], white);
          PlotPoint(RawPoints[center], white);
          PlotPoint(RawPoints[right], white);
        end;
        HarmCircle.center.x := cos(Phas[1]*pi/180.0)*Amp[1];
        HarmCircle.center.y := sin(Phas[1]*pi/180.0)*Amp[1];
        HarmCircle.radius := 7.0;
        PlotPoint(HarmCircle.center,brown);
        SetColor(brown);
        PlotCircle(HarmCircle);
      end;
      Drawit := false;
($ifdef looping)
 end;
($endif)
      StartTime := Ticks - StartTime;
      SetColor(LightGray);
      if YMax > 250 then begin
        MoveTo(0,0);
        OutText('Max Inscribed Circle');
        MoveTo(0,10);
        OutText(FName);
        MoveTo(0,20);
        OutText('Calc Time:'+FloatToStr(StartTime/18.2,5,2)+' sec.');
      end;
      MoveTo(0,40);
      OutText('Diameter: 14.000 in.');
      MoveTo(0,50);
      OutText('T.I.R:      '+floatToStr(TIR/gain,5,3)+' in.');
      MoveTo(0,60);
      OutText('Magnification: '+IntToStr(Gain,5));
      MoveTo(0,80);
      OutText('1st Harmonic');
      MoveTo(0,90);
      OutText(floatToStr(Amp[1]/gain,6,3)+' in.  '+
              floatToStr(Phas[1],5,1)+'°');
```

```
    MoveTo(0,110);
    OutText('Tangent Points');
    MoveTo(0,120);
    With root^ do begin
      OutText(floatToStr(UnGain(Probe[left]),6,3)+' in.   '+
              floatToStr(left*360.0/256,5,1)+'`');
      MoveTo(0,130);
      OutText(floatToStr(UnGain(Probe[center]),6,3)+' in.   '+
              floatToStr(center*360.0/256,5,1)+'`');
      MoveTo(0,140);
      OutText(floatToStr(UnGain(Probe[right]),6,3)+' in.   '+
              floatToStr(right*360.0/256,5,1)+'`');
    end;
    MoveTo(0,160);
    OutText('MIC');
    MoveTo(0,170);
    OutText(floatToStr(2*UnGain(MIC.Radius),6,3)+' in.   ');
    MoveTo(0,180);
    OutText(floatToStr(sqrt(sqr(MIC.center.x)+sqr(MIC.center.y))/gain,6,3)+' in.
            floatToStr(180.0/pi*atan2(MIC.center.y,MIC.center.x),5,1)+'`');
    MoveTo(0,190);
    OutText('Points in MIC = '+IntToStr(CheckIC(MIC,0),3));
    if Ymax > 250 then i := YMax-39
      else i := 0;
    SetTextJustify(CenterText,TopText);
    MoveTo(130,i);
    OutText('Copyright (C) 1989');
    MoveTo(130,i+10);
    OutText('Akron Standard Division');
    MoveTo(130,i+20);
    OutText('of Eagle Picher Industries, Inc.');
    MoveTo(130,i+30);
    OutText('All Rights Reserved.');
    SetTextJustify(LeftText,TopText);

{   PrtScr;}
    readln;
    RestoreCRTMode;
    RestoreTextScreen;
    writeln(StdOut,FName,2*UnGain(MIC.Radius):10:3);
  end;
  Close(StdOut);
end.
```

Turbo Assembler   Version 1.0
RESORT3.ASM

```
Turbo Assembler   Version 1.0
RESORT3.ASM 1                                      name      resort3
 2                                      public    resort
 3  0000                                model     tpascal
 4                                      locals
 5                                      emul
 6
 7       = 0000                         nil       equ      0
 8
 9  =000                                 TreeEl   struc
10
11  =000  01*(????)                     prev      dw       ?
12  =002  01*(????)                     prevseg   dw       ?
13  =004  01*(????)                     next      dw       ?
14  =006  01*(????)                     nextseg   dw       ?
15  =008  01*(????)                     left      dw       ?
16  =00A  01*(????)                     center    dw       ?
17  =00C  01*(????)                     right     dw       ?
18  =00E  01*(????????????????)         midx      dq       ?
19  =016  01*(????????????????)         midy      dq       ?
20  =01E  01*(????????????????)         height    dq       ?
21  =026  01*(????????????????)         leftmpx   dq       ?
22  =02E  01*(????????????????)         leftmpy   dq       ?
23  =036  01*(????????????????)         rightmpx  dq       ?
24  =03E  01*(????????????????)         rightmpy  dq       ?
25
26  =046                                TreeEl    ends
27
28  0000                                .data
29                                      extrn     root:dword
30
31  0000                                .code
32
33  0000                                ReSort    proc    near tm:dword, tn:dword
34                                      local     stat87:word
35
36                                ;Decide which is bigger
37  0000  55 8B EC 83 EC 02 8B +        mov       bx, word ptr tm
38        5E 08
```

```
39 0009  9B DD 47 1E              fld     [bx].height
40 000D  8B CB                    mov     cx, bx
41 000F  8B 5E 04                 mov     bx, word ptr tn
42 0012  9B DC 5F 1E              fcomp   [bx].height
43 0016  9B DD 7E FE              fstsw   stat87
44 001A  90 9B                    fwait
45 001C  F7 46 FE 4100            test    stat87, 4100h
46 0021  74 02                    jz      aa035
47 0023  87 D9                    xchg    bx, cx
48                        aa035:
49                        ;Set up to search for re-insertion point
50                        ;  h := tm^.height;                ;floating point stack
51                        ;  ti := nil;                      ;si
52                        ;  tj := root;                     ;di
53 0025  9B DD 47 1E              fld     [bx].height
54 0029  8B 3E 0000e              mov     di, word ptr root    ;tj
55 002D  BE 0000                  mov     si, nil              ;ti
56
57                        ;Now, do the search
58                        ;  while (tj <> nil) and (tj^.height < h) do begin
59                        ;    ti := tj;
```

Turbo Assembler Version 1.0
RESORT3.ASM

```
60                        ;    tj := tj^.next;
61                        ;  end;
62                        ;(new location is between i and j)
63
64 0030  83 FF 00         aa040:  cmp     di, nil              ;is tj nil?
65 0033  74 18                    jz      aa045                ;yep
66 0035  9B DC 55 1E              fcom    [di].height
67 0039  9B DD 7E FE              fstsw   stat87
68 003D  90 9B                    fwait
69 003F  F7 46 FE 4100            test    stat87, 4100h
70 0044  75 07                    jnz     aa045                ;both bits zero says st > operand
71 0046  8B F7                    mov     si, di               ;ti := tj
72 0048  8B 7D 04                 mov     di, [di].next        ;tj := tj^.next
73 004B  EB E3                    jmp     aa040
74
75                        aa045:
76                        ;Now, rehook the element where it belongs
77                        ;  tm^.prev := ti;
78                        ;  tm^.next := tj;
79                        ;  if ti <> nil then ti^.next := tm
80                        ;  else root := tm;
81                        ;  if tj <> nil then tj^.prev := tm;
82 004D  BA 0000                  mov     dx, nil
83 0050  83 FF 00                 cmp     di, nil
84 0053  74 07                    jz      aa050
85 0055  8C DA                    mov     dx, ds
86 0057  89 1D                    mov     [di].prev, bx        ;tj^.prev := tm
87 0059  8C 5D 02                 mov     [di].prevseg, ds
88 005C  89 7F 04         aa050:  mov     [bx].next, di        ;tm^.next := tj
89 005F  89 57 06                 mov     [bx].nextseg, dx
90 0062  BA 0000                  mov     dx, nil
91 0065  83 FE 00                 cmp     si, nil
92 0068  74 08                    jz      aa055
93 006A  8C DA                    mov     dx, ds
94 006C  89 5C 04                 mov     [si].next, bx        ;ti^.next := tm
95 006F  8C 5C 06                 mov     [si].nextseg, ds
96 0072  89 37            aa055:  mov     [bx].prev, si        ;tm^.prev := ti...bx still has tm
97 0074  89 57 02                 mov     [bx].prevseg, dx
98 0077  83 FE 00                 cmp     si, nil              ;if ti <> nil then...
99 007A  75 04                    jnz     aa060
100 007C 89 1E 0000e              mov     word ptr root, bx    ;else root := tm
101 0080 9B DD D8         aa060:  fstp    st(0)                ;free up floating point stack
102                       ;Set up to search for re-insertion point for bigger element
103                       ;  h := tm^.height;                ;floating point stack
104                       ;  ti := last inserted;             ;si
105                       ;  tj := old tj;                    ;di
106                       ;di is still successor of hooked el
107 0083 8B F3                    mov     si, bx               ;new ti is element just hooked
108 0085 8B D9                    mov     bx, cx               ;new element to find hook location
109 0087 9B DD 47 1E              fld     [bx].height          ;height of new hook element
110
111                       ;Now, do the search
112                       ;  while (tj <> nil) and (tj^.height < h) do begin
113                       ;    ti := tj;
114                       ;    tj := tj^.next;
115                       ;  end;
116                       ;(new location is between i and j)
117
118 008B 83 FF 00         aa065:  cmp     di, nil              ;is tj nil?
```

Turbo Assembler Version 1.0
RESORT3.ASM

```
119 008E 74 18                    jz      aa070                ;yep
120 0090 9B DC 55 1E              fcom    [di].height
121 0094 9B DD 7E FE              fstsw   stat87
122 0098 90 9B                    fwait
123 009A F7 46 FE 4100            test    stat87, 4100h
124 009F 75 07                    jnz     aa070                ;both bits zero says st > operand
125 00A1 8B F7                    mov     si, di               ;ti := tj
126 00A3 8B 7D 04                 mov     di, [di].next        ;tj := tj^.next
127 00A6 EB E3                    jmp     aa065
128
129                       aa070:
130                       ;Now, rehook the element where it belongs
131                       ;  tm^.prev := ti;
132                       ;  tm^.next := tj;
133                       ;  if ti <> nil then ti^.next := tm
134                       ;  else root := tm;
135                       ;  if tj <> nil then tj^.prev := tm;
```

```
136 00A8  BA 0000                    mov     dx, nil
137 00AB  83 FF 00                   cmp     di, nil
138 00AE  74 07                      jz      @@075
139 00B0  8C DA                      mov     dx, ds
140 00B2  89 1D                      mov     [di].prev, bx         ;tj^.prev := tm
141 00B4  8C 5D 02                   mov     [di].prevseg, ds
142 00B7  89 7F 04          @@075:   mov     [bx].next, di         ;tm^.next := tj
143 00BA  89 57 06                   mov     [bx].nextseg, dx
144 00BD  BA 0000                    mov     dx, nil
145 00C0  83 FE 00                   cmp     si, nil
146 00C3  74 08                      jz      @@080
147 00C5  8C DA                      mov     dx, ds
148 00C7  89 5C 04                   mov     [si].next, bx         ;ti^.next := tm
149 00CA  8C 5C 06                   mov     [si].nextseg, ds
150 00CD  89 37             @@080:   mov     [bx].prev, si         ;tm^.prev := ti...bx still has tm
151 00CF  89 57 02                   mov     [bx].prevseg, dx
152 00D2  83 FE 00                   cmp     si, nil               ;if ti <> nil then...
153                         ;        jnz     @@085
154                         ;        mov     word ptr root, bx     ;else root := tm
155 00D5  9B DD D8          @@085:   fstp    st(0)                 ;free up floating point stack
156 00D8  8B E5 5D C2 0008           ret
157
158 00DE                    ReSort   endp
159                                  end
Turbo Assembler  Version 1.0
Symbol Table Symbol Name                          Type     Value ??DATE                               Text     "04-13-89"
??FILENAME                           Text     "RESORT3 "
??TIME                               Text     "17:34:29"
??VERSION                            Number   0100
@@035                                Near     CODE:0025
@@040                                Near     CODE:0030
@@045                                Near     CODE:004D
@@050                                Near     CODE:005C
@@055                                Near     CODE:0072
@@060                                Near     CODE:0080
@@065                                Near     CODE:008B
@@070                                Near     CODE:00A8
@@075                                Near     CODE:00B7
@@080                                Near     CODE:00CD
@@085                                Near     CODE:00D5
@CODE                                Text     CODE
@CODESIZE                            Text     1
@CPU                                 Text     0101H
@CURSEG                              Text     CODE
@DATA                                Text     DATA
@DATASIZE                            Text     0
@FILENAME                            Text     RESORT3
@WORDSIZE                            Text     2
NIL                                  Number   0000
RESORT                               Near     CODE:0000
ROOT                                 Dword    DATA:---- Extern
STAT87                               Number   [BP-0002]
TM                                   Number   [BP+0008]
TN                                   Number   [BP+0004]

Structure Name                       Type     Offset

TREEEL
  PREV                               Word     0000
  PREVSEG                            Word     0002
  NEXT                               Word     0004
  NEXTSEG                            Word     0006
  LEFT                               Word     0008
  CENTER                             Word     000A
  RIGHT                              Word     000C
  MIDX                               Qword    000E
  MIDY                               Qword    0016
  HEIGHT                             Qword    001E
  LEFTMPX                            Qword    0026
  LEFTMPY                            Qword    002E
  RIGHTMPX                           Qword    0036
  RIGHTMPY                           Qword    003E Groups & Segments                    Bit Size Align  Combine Class CODE                                 16  00DE Byte   Public
DATA                                 16  0000 Word   Public
Turbo Assembler  Version 1.0
UNHOOK.ASM 1                                           name     unhook
  2                                           public   unhook
  3  0000                                    .model    tpascal
  4                                           locals
  5                                           emul
  6
  7      = 0000                      nil      equ      0
  8
  9  =000                            TreeEl   struc
```

```
10
11  =000  01=(????)                    prev       dw      ?
12  =002  01=(????)                    prevseg    dw      ?
13  =004  01=(????)                    next       dw      ?
14  =006  01=(????)                    nextseg    dw      ?
15  =008  01=(????)                    left       dw      ?
16  =00A  01=(????)                    center     dw      ?
17  =00C  01=(????)                    right      dw      ?
18  =00E  01=(????????????????)        midx       dq      ?
19  =016  01=(????????????????)        midy       dq      ?
20  =01E  01=(????????????????)        height     dq      ?
21  =026  01=(????????????????)        leftmpx    dq      ?
22  =02E  01=(????????????????)        leftmpy    dq      ?
23  =036  01=(????????????????)        rightmpx   dq      ?
24  =03E  01=(????????????????)        rightmpy   dq      ?
25
26  =046                               TreeEl  ends
27
28  0000                               .data
29                                             extrn   root:dword
30
31  0000                               .code
32
33  0000                               Unhook  proc    near tm:dword
34
35                                     ;First, unhook Tree[m] from the rest of the tree
36                                     ;   p := tm^.prev;
37                                     ;   n := tm^.next;
38                                     ;   if p <> nil (it could be) then p^.next := n
39                                     ;   else root := n;
40                                     ;   if n <> -1 (it might be) then n^.prev := p;
41  0000  55 8B EC 8B 5E 04            mov     bx, word ptr tm          ;bx is tm
42  0006  8B 37                        mov     si, [bx].prev
43  0008  8B 57 02                     mov     dx, [bx].prevseg         ;dx:si is p
44  000B  C4 7F 04                     les     di, dword ptr [bx].next  ;es:di is n
45  000E  83 FE 00                     cmp     si, nil                  ;if p <> nil...
46  0011  74 09                        jz      @@010
47  0013  89 7C 04                     mov     [si].next, di            ;p^.next := n
48  0016  8C 44 06                     mov     [si].nextseg, es
49  0019  EB 09 90                     jmp     @@020
50
51  001C  89 3E 0000e       @@010:     mov     word ptr root, di        ;else root := n
52  0020  8C 06 0002e                  mov     word ptr root[2], es
53  0024  83 FF 00          @@020:     cmp     di, nil                  ;if n <> nil...
54  0027  74 05                        jz      @@090
55  0029  89 35                        mov     [di].prev, si            ;n^.prev := p
56  002B  89 55 02                     mov     [di].prevseg, dx
57  002E  5D C2 0004        @@090:     ret
58
59  0032                               unhook  endp
Turbo Assembler  Version 1.0
UNHOOK.ASM 60                                         end
Turbo Assembler  Version 1.0
Symbol Table Symbol Name                     Type      Value ??DATE                          Text      "04-13-89"
??FILENAME                      Text      "UNHOOK  "
??TIME                          Text      "17:23:12"
??VERSION                       Number    0100
@@010                           Near      CODE:001C
@@020                           Near      CODE:0024
@@090                           Near      CODE:002E
@CODE                           Text      CODE
@CODESIZE                       Text      1
@CPU                            Text      0101H
@CURSEG                         Text      CODE
@DATA                           Text      DATA
@DATASIZE                       Text      0
@FILENAME                       Text      UNHOOK
@WORDSIZE                       Text      2
NIL                             Number    0000
ROOT                            Dword     DATA:---- Extern
TM                              Number    [BP+0004]
UNHOOK                          Near      CODE:0000

Structure Name                  Type      Offset

TREEEL
  PREV                          Word      0000
  PREVSEG                       Word      0002
  NEXT                          Word      0004
  NEXTSEG                       Word      0006
  LEFT                          Word      0008
  CENTER                        Word      000A
  RIGHT                         Word      000C
  MIDX                          Qword     000E
  MIDY                          Qword     0016
  HEIGHT                        Qword     001E
  LEFTMPX                       Qword     0026
  LEFTMPY                       Qword     002E
  RIGHTMPX                      Qword     0036
  RIGHTMPY                      Qword     003E Groups & Segments               Bit Size Align   Combine Class CODE                            16  0032 Byte    Public
DATA                            16  0000 Word    Public
```

What is claimed is:

1. A method for determining a center of a surface feature of an object, said method comprising the steps of:
   (a) positioning the object in fixed relation to a measuring axis of a machine which includes at least one distance measuring device for generating signals correlated to the distance between a point on said measuring axis and points located on said surface feature;
   (b) effecting relative movement between said object and said distance measuring device in order to generate a series of said signals, each of which is correlated to the distance between said point on said measuring axis and one of a corresponding series of said points located on said surface feature;
   (c) processing said signals to repetitively:
      (i) identify ones of said series of points incapable of lying on a maximum inscribed circle of said surface feature, and
      (ii) effectively discard said ones of said points until only a predetermined number of said points remain in said series of points, said predetermined number of points specifying said maximum inscribed circle, and
   (d) calculating the center of said maximum inscribed circle specified by said predetermined number of points, said center corresponding to a center of said surface feature of the object.

2. A method for measuring the effective size of a surface feature of an object, said method comprising the steps of:
   (a) positioning the object in fixed relation to a measuring axis of a machine which includes at least one distance measuring device for generating at least one signal correlated to the distance between a point on said measuring axis and points located said surface feature;
   (b) effecting relative movement between said object and said distance measuring device and using said signal in order to generate series of data samples, each data sample in said series of data samples being correlated to the distance between said point on said measuring axis and one of a corresponding series of said points located on said surface feature;
   (c) processing said series of data samples to repetitively:
      (i) identify ones of said data samples in said series incapable of corresponding to points on a maximum inscribed circle of said surface feature, and
      (ii) effectively discard said ones of said data samples from said series until only a predetermined number of said data samples remain therein, said predetermined number of data samples specifying said maximum inscribed circle, and
   (d) calculating the diameter of said maximum inscribed circle specified by said predetermined number of data samples as a measure of the effective size of the surface feature.

3. A method for measuring the out-of-roundness of a surface feature of an object, said method comprising the steps of:
   (a) positioning the object in fixed relation to a measuring axis of a machine which includes at least one distance measuring device for generating at least one signal correlated to the distance between a point on said measuring axis and points located on said surface feature;
   (b) effecting relative movement between said object and said distance measuring device and using said signal in order to generate a series of data samples, each data sample in said series of data samples being correlated to the distance between said point on said measuring axis and one of a corresponding series of said points located on said surface feature;
   (c) processing said series of data samples to repetitively:
      (i) identify ones of said data samples in said series incapable of corresponding to points on a maximum inscribed circle of said surface feature, and
      (ii) effectively discard said ones of said data samples from said series until only a predetermined number of said data samples remain therein, said predetermined number of data samples specifying said maximum inscribed circle;
   (d) calculating the radius and center of said maximum inscribed circle specified by said predetermined number of data samples;
   (e) calculating the maximum distance between said center and any of said points in said series of points, and
   (f) subtracting said radius from said maximum distance to obtain a measurement of the out-of-roundness of said surface feature.

4. A method for measuring the total indicated runout (TIR) of a surface feature of an object, said method comprising the steps of:
   (a) positioning the object in fixed relation to a measuring axis of a machine which includes at least one distance measuring device for generating at least one signal correlated to the distance between a point on said measuring axis and points on said surface feature;
   (b) effecting relative movement between said object and said distance measuring device and using said signal in order to generate a series of data samples, each data sample in said series of data samples being correlated to the distance between said point on said measuring axis and one of a corresponding series of said points located on said surface feature;
   (c) processing said series of data samples to repetitively:
      (i) identify ones of said data samples in said series incapable of corresponding to points on a maximum inscribed circle of said surface feature, and
      (ii) effectively discard said ones of said data samples from said series until only a predetermined number of said data samples remain therein, said predetermined number of data samples specifying said maximum inscribed circle;
   (d) calculating the center of said maximum inscribed circle specified by said predetermined number of data samples;
   (e) calculating both the maximum distance from said center to any point in said series of points and the minimum distance from said center to any point in said series of points, and the minimum distance from said center to any point in said series of points, and
   (f) calculating the difference between said maximum distance and said minimum distance to obtain a measurement of the total indicated runout (TIR) of said surface feature.

5. A method for measuring the eccentricity between a first surface feature and a second surface feature of an object, said method comprising the steps of:
   (a) positioning the object in fixed relation to a measuring axis of a machine which includes at least one distance measuring device for generating a first signal correlated to the distance between a point on said measuring axis and points located on said first surface feature and a second signal correlated to the distance between said point on said measuring axis and points located on said second surface feature;

(b) effecting relative movement between said object and said distance measuring device and using said first signal in order to generate a first series of data samples, each data sample in said first series of data samples being correlated to the distance between said point on a measuring axis and a corresponding one of said points located on said first surface feature;

(c) repetitively:
  (i) identifying ones of said data samples in said first series of data samples incapable of corresponding to points lying on a first maximum inscribed circle of said first surface feature, and
  (ii) effectively discarding said ones of said data samples from said first series of data samples until only a predetermined number of said data samples specifying said first maximum inscribed circle of said first surface feature remain in said first series of data samples;

(d) calculating the center of said first maximum inscribed circle;

(e) effecting relative movement between said object and said distance measuring device and using said second signal in order to generate a second series of data samples, each data sample in said second series of data samples being correlated to the distance between said point on said measuring axis and a corresponding one of said points located on said second surface feature;

(f) repetitively:
  (i) identifying ones of said data samples in said second series of data samples incapable of corresponding to points lying on a second maximum inscribed circle of said second surface feature, and
  (ii) effectively discarding said ones of said data samples from said second series of data samples until only a predetermined number of said data samples specifying said second maximum inscribed circle of said second surface feature remain in said second series of data samples;

(g) calculating the center of said second maximum inscribed circle; and (h) calculating the distance between said centers of said first and second maximum inscribed circles as a measure of the eccentricity between said first and second surface features.

6. A method for determining a center of a first surface feature of an object and measuring the total indicated runout (TIR) of a second surface feature of the object with reference to that center, said method comprising the steps of:

(a) positioning the object in fixed relation to a measuring axis of a machine which includes at least one distance measuring device for generating a first signal correlated to the distance between a point on said measuring axis and points located on said first surface feature and a second signal correlated to the distance between said point on said measuring axis and points located on said second surface feature;

(b) effecting relative movement between said object and said distance measuring device and using said first signal in order to generate a first series of data samples, each data sample in said first series of data samples being correlated to the distance between said point on a measuring axis and a corresponding one of said points located on said first surface feature;

(c) effecting relative movement between said object and said distance measuring device and using said second signal in order to generate a second series of data samples, each data sample in said second series of data samples being correlated to the distance between said point on said measuring axis and a corresponding one of said points located on said second surface feature;

(d) repetitively:
  (i) identifying ones of said data samples in said first series of data samples incapable of corresponding to points lying on a first maximum inscribed circle of said first surface feature, and
  (ii) effectively discarding said ones of said data samples from said first series of data samples until only a predetermined number of said data samples specifying said first maximum inscribed circle of said first surface feature remain in said first series of data samples;

(e) determining the center of said first surface feature by calculating the location of the center of a circle which intersects each point on said first surface feature represented by each of said predetermined number of data samples from said first series;

(f) calculating both the maximum distance from said center to any point in said second series of points and the minimum distance from said center to any point in said second series of points, and (g) calculating the difference between said maximum distance and said minimum distance to obtain a measurement of the total indicated runout (TIR) of the second surface feature with respect to the center of the first surface feature.

7. In a method for determining the eccentricity between a first surface feature and a second surface feature of an object, said surface features having respective first and second centers, the improvement comprising determining said respective center of at least one of said surface features in accordance with the steps of:

(a) positioning the object in fixed relation to a measuring axis of a machine which includes at least one distance measuring device for generating a signal correlated to the distance between a point on said measuring axis and points located on said least one surface feature;

(b) effecting relative movement between said object and said distance measuring device and using said signal in order to generate a series of data samples, each data sample in said series of data samples being correlated to the distance between said point on said measuring axis and a corresponding one of said points located on said at least one surface feature;

(c) processing said series of data samples to repetitively:
  (i) identify ones of said data samples in said series incapable of corresponding to points on a maximum inscribed circle of said at least one surface feature, and
  (ii) effectively discard said ones of said data samples from said series until only a predetermined number of said data samples remain therein, said predetermined number of data samples specifying said maximum inscribed circle, and (d) calculating the center of said maximum inscribed circle specified by said predetermined number of data samples, said center corresponding to the center of said at least one surface feature of the object.

8. A method for determining a center of a surface feature of an object, said method comprising the steps of:
(a) positioning the object in fixed relation to a measuring axis of a machine which includes at least one distance measuring device for generating a signal correlated to the distance between a point on said measuring axis and points located on said surface feature;
(b) effecting relative movement between said object and said distance measuring device and using said signal in order to generate a series of data samples, each data sample in said series of data samples being correlated to the distance between said point on said measuring axis and a corresponding one of said points located on said surface feature;
(c) for each set of three of said data samples remaining in said series corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
(d) reducing said series of data samples by eliminating therefrom the data sample remaining therein which corresponds to that vertex the distance between which and its associated fourth point is the smallest;
(e) repeating steps (c) and (d) to further reduce said series of data samples until only a predetermined number of data samples representing particular ones of said points on said surface feature remain therein, and
(f) calculating the location of the center of a circle which intersects each of said particular ones of said points to determine the center of said surface feature.

9. The method of claim 8 wherein step (d) thereof further comprises the steps of determining whether any of said data samples defines a concavity of a polygon defined by said series of data samples and, if so, deferring elimination of each data sample defining a said concavity of said polygon.

10. The method of claim 9 wherein said deferring step includes the step of assigning an arbitrarily large value to a number representing said distance between each fourth point associated with a data sample defining a said concavity and the vertex associated with said fourth point.

11. The method of claim 8 wherein said predetermined number is three.

12. A method for measuring the effective size of a surface feature of an object, said method comprising the steps of:
(a) positioning the object in fixed relation to a measuring axis of a machine which includes at least one distance measuring device for generating a signal correlated to the distance between a point on said measuring axis and a series of points located on said surface feature;
(b) effecting relative movement between said object and said distance measuring device and using said signal in order to generate a series of data samples, each data sample in said series of data samples being correlated to the distance between said point on said measuring axis and a corresponding one of said series of points located on said surface feature;
(c) for each set of three of said data samples in said series corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
(d) reducing said series of data samples by eliminating therefrom the data sample remaining therein which corresponds to that vertex the distance between which and its associated fourth point is the smallest;
(e) repeating steps (c) and (d) to further reduce said series of data samples until only a predetermined number of data samples representing particular ones of said points on said surface feature remain in said series of data samples, and
(f) calculating the diameter of the circle which intersects each of said particular ones of said points as a measure of the effective size of said surface feature.

13. The method of claim 12 wherein step (d) thereof further comprises the steps of determining whether any of said data samples defines a concavity of a polygon defined by said series of points and, if so, deferring elimination of each data sample defining a said concavity of said polygon.

14. The method of claim 13 wherein said deferring step including the step of assigning an arbitrarily large value to a number representing said distance between each fourth point associated with a data sample defining a said concavity and the vertex associated with said fourth point.

15. The method of claim 12 wherein said predetermined number is three.

16. A method for measuring the out-of-roundness of a surface feature of an object, said method comprising the steps of:
(a) positioning the object in fixed relation to a measuring axis of a machine which includes at least one distance measuring device for generating a signal correlated to the distance between a point on said measuring axis and a series of points located on said surface feature;
(b) effecting relative movement between said object and said distance measuring device and using said signal in order to generate a series of data samples, each data sample in said series of data samples being correlated to the distance between said point on said measuring axis and a corresponding one of said series of points located on said surface feature;
(c) for each set of three of said data samples in said series corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;

(d) reducing said series of data samples by eliminating the remaining data sample in said series corresponding to that vertex the distance between which and its corresponding fourth point is the smallest;

(e) repeating steps (c) and (d) to further reduce said series of data samples until only a predetermined number of data samples representing particular ones of said points on said surface feature remain in said series of data samples, and (f) calculating the maximum distance between any of said points represented by said series of data samples prior to reduction thereof and the nearest point thereto on a circle intersecting each of said particular ones of said points as a measure of the out-of-roundness of said surface feature.

17. A method for measuring the total indicated runout (TIR) of a surface feature of an object, said method comprising the steps of:

(a) positioning the object in fixed relation to a measuring axis of a machine which includes at least one distance measuring device for generating a signal correlated to the distance between a point on said measuring axis and a series of points located on said surface feature;

(b) effecting relative movement between said object and said distance measuring device and using said signal in order to generate a series of data samples, each data sample in said series of data samples being correlated to the distance between said point on said measuring axis and a corresponding one of said series of points located on said surface feature;

(c) for each set of three of said data samples remaining in said series corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;

(d) reducing said series of data samples by eliminating therefrom the data sample remaining therein which corresponds to that vertex the distance between which and its associated fourth point is the smallest;

(e) repeating steps (c) and (d) to further reduce said series of data samples until only a predetermined number of data samples representing particular ones of said points on said surface feature remain in said series of data samples, and (f) calculating the location of the center of a circle which intersects said particular ones of said points to determine the center of said surface feature;

(g) calculating both the maximum distance from said center to any point present in said series of points prior to carrying out said reducing step and the minimum distance from said center to any point present in said series of points prior to carrying out said reducing step, and (h) calculating the difference between the maximum distance and said minimum distance as a measure of the total indicated runout (TIR) of said surface feature.

18. The method of claim 17 wherein said steps of generating said first and second series of data samples are carried out substantially simultaneously by effecting relative rotational movement about said measuring axis between said object and (i) a first probe mounted for sensing a parameter correlated to the distance between said measuring axis and said first surface feature and (ii) a second probe mounted for sensing a parameter correlated to the distance between said measuring axis and said second surface feature.

19. A method for determining the center of a first surface feature of an object and measuring the total indicated runout (TIR) of a second surface feature of the object with respect to that center, said method comprising the steps of:

(a) positioning the object in fixed relation to a measuring axis of a machine which includes at least one distance measuring device for generating a first signal correlated to the distance between a point on said measuring axis and a first series of points located on said first surface feature and a second signal correlated to the distance between said point on said measuring axis and a second series of points located on said second surface feature;

(b) effecting relative movement between said object and said distance measuring device and using said first signal in order to generate a first series of data samples, each data sample in said first series of data samples being correlated to the distance between said point on said measuring axis and a corresponding point in said first series of points located on said surface feature;

(c) effecting relative movement between said object and said distance measuring device and using said second signal in order to generate a second series of data samples, each data sample in said second series of data samples being correlated to the distance between said point on said measuring axis and a corresponding point in said second series of points located on said second surface feature;

(d) for each set of three of said data samples remaining in said first series corresponding to a group of three adjacent ones of said points on said first surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;

(e) reducing said first series of data samples by eliminating therefrom the remaining data sample corresponding to that vertex the distance between which and its corresponding fourth point is the smallest;

(f) repeating steps (d) and (e) to further reduce said first series of data samples until only a predetermined number of data samples representing particular ones of said points on said first surface feature remain in said first series of data samples;

(g) determining the center of said first surface feature by calculating the location of the center of a circle which intersects each of said particular ones of said points on said first surface feature;

(h) calculating both the maximum distance from said center to any point present in said second series of points prior to carrying out said reducing step and the minimum distance from said center to any point present in said second series of points prior to carrying out said reducing step, and (i) calculating the difference between said maximum distance and said minimum distance as a measure of the total indicated runout (TIR) between said first surface feature and said second surface feature.

20. The method of claim 19 wherein said steps of generating said first and second series of data samples are carried out substantially simultaneously by effecting relative rotational movement about said measuring axis between said object and (i) a first probe associated with said distance measuring device and mounted for sensing a parameter correlated to the distance between said measuring axis and said first surface feature and (ii) a second probe associated with said distance measuring device and mounted for sensing a parameter correlated to the distance between said measuring axis and said second surface feature.

21. A method for measuring the eccentricity between a first surface feature and a second surface feature of an object, said method comprising the steps of:
  (a) positioning the object in fixed relation to a measuring axis of a machine which includes at least one distance measuring device for generating a first signal correlated to the distance between a point on said measuring axis and a first series of points located on said first surface feature and a second signal correlated to the distance between said point on said measuring axis and a second series of points located on said second surface feature;
  (b) effecting relative movement between said object and said distance measuring device and using said first signal in order to generate a first series of data samples, each data sample in said first series of data samples being correlated to the distance between said point on said measuring axis and a corresponding point in said first series of points located on said first surface feature;
  (c) effecting relative movement between said object and said distance measuring device and using said second signal in order to generate a second series of data samples, each data sample in said second series of data samples being correlated to the distance between said point on said measuring axis and a corresponding point in said second series of points located on said second surface feature;
  (d) for each set of three data samples remaining in said first series corresponding to a group of three adjacent ones of said points on said first surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
  (e) reducing said first series of data samples by eliminating therefrom the data sample remaining therein which corresponds to that vertex the distance between which and its associated fourth point is the smallest;
  (f) repeating steps (d) and (e) to further reduce said first series of data samples until only a first predetermined number of data samples representing particular ones of said points on said first surface feature remain in said first series of data samples;
  (g) determining the center of said first surface feature by calculating the location of the center of a circle which intersects each of said particular ones of said points on said first series of points;
  (h) for each set of three data samples remaining in said second series corresponding to a group of three adjacent ones of said points on said second surface feature, each said group having a vertex separating two endpoints, calculating a fifth point defined by the intersection of the perpendicular bisectors of a third line and a fourth line, said third line connecting said vertex with one of said endpoints, said fourth line connecting said vertex with the other one of said endpoints;
  (i) reducing said second series of data samples by eliminating therefrom the data sample remaining therein which corresponds to that vertex the distance between which and its corresponding fifth point is the smallest;
  (j) repeating steps (h) and (i) to further reduce said second series of data samples until only a second predetermined number of data samples representing particular ones of said points on said second surface feature remain in said second series of data samples;
  (k) determining the center of said second surface feature by calculating the location of the center of a second circle which intersects each of said particular ones of said points in said second series of points, and
  (l) calculating the distance between said centers of said first and second surface features, respectively as a measure of the eccentricity between said first and second surface features.

22. The method of claim 21 wherein said steps of generating said first and second series of data samples are carried out substantially simultaneously by effecting relative rotational movement about said measuring axis between said object and (i) a first probe mounted for sensing a parameter correlated to the distance between said measuring axis and said first series of points and (ii) a second probe mounted for sensing a parameter correlated to the distance between said measuring axis and said second series of points.

23. An apparatus for determining the center of a surface feature of an object, said apparatus comprising:
  (a) positioning means for maintaining the position of the object fixed in relation to a measuring axis;
  (b) probe means for generating a signal correlated to the distance between a point on said measuring axis and each of a series of points on the surface feature, said probe means and the surface feature being movable with respect to one another, and
  (c) computer means coupled to said probe means for:
    (i) processing said signal to repetitively:
      (1) identify ones of said points incapable of lying on a maximum inscribed circle of said surface feature and
      (2) effectively discard said ones of said points until only a predetermined number of said points remain in said series of points, said predetermined number of points specifying said maximum inscribed circle, and
    (ii) calculating the center of said maximum inscribed circle, said center corresponding to the center of said surface feature of the object.

24. An apparatus for determining the center of a surface feature of an object, said apparatus comprising:
  (a) positioning means for maintaining the position of the object fixed in relation to a measuring axis;

(b) probe means for generating a signal correlated to the distance between a point on said measuring axis and each of a series of points on the surface feature, said probe means and the surface feature being movable with respect to one another while said position of the object is maintained fixed with respect to said measuring axis, and (c) computer means coupled to said probe means for:
  (i) sampling said signal and storing a series of data samples, each data sample in said series of data samples being correlated to the distance between said point on said measuring axis and one of a corresponding series of points located at angularly spaced intervals on said surface feature;
  (ii) processing said series of data samples to repetitively:
    (1) identify ones of said data samples corresponding to points incapable of lying on a maximum inscribed circle of said surface feature, and
    (2) effectively discard said ones of data samples until only a predetermined number of said data samples remain in said series of data samples, said remaining data samples corresponding to points lying on said maximum inscribed circle, and for
  (iii) calculating the center of said maximum inscribed circle, said center corresponding to the center of said surface feature of the object.

25. An apparatus for measuring the effective size of a surface feature of an object, said apparatus comprising:
  (a) positioning means for maintaining the position of the object fixed in relation to a measuring axis;
  (b) probe means for generating a signal correlated to the distance between a point on said measuring axis and each of a series of points on the surface feature, said probe means and the surface feature being movable with respect to one another, and
  (c) computer means coupled to said probe means for:
    (i) sampling said signal and storing a series of data samples, each data sample in said series of data samples being correlated to the distance between said point on said measuring axis and one of a corresponding series of points located at angularly spaced intervals on said surface feature;
    (ii) processing said series of data samples to repetitively:
      (1) identify ones of said data samples corresponding to points incapable of lying on a maximum inscribed circle of said surface feature, and
      (2) effectively discard said ones of data samples until only a predetermined number of said data samples remain in said series of data samples, said remaining data samples corresponding to points lying on said maximum inscribed circle, and for
    (iii) calculating the diameter of said maximum inscribed circle as a measure of the effective size of the surface feature.

26. An apparatus for measuring the out-of-roundness of a surface feature of an object, said apparatus comprising:
  (a) positioning means for maintaining the object fixed in relation to a measuring axis;
  (b) probe means for generating a signal correlated to the distance between a point on said measuring axis and each of a series of points on the surface feature, said probe means and the surface feature being movable with respect to one another, and
  (c) computer means coupled to said probe means for:
    (i) sampling said signal and storing a series of data samples, each data sample in said series of data samples being correlated to the distance between said point on said measuring axis and one of a corresponding series of points located at angularly spaced intervals on said surface feature;
    (ii) processing said series of data samples to repetitively:
      (1) identify ones of said data samples corresponding to points incapable of lying on a maximum inscribed circle of said surface feature, and
      (2) effectively discard said ones of data samples until only a predetermined number of said data samples remain in said series of data samples, said remaining data samples corresponding to points lying on said maximum inscribed circle;
    (iii) calculating the radius and center of said maximum inscribed circle;
    (iv) determining the maximum distance between said center and any of said points in said series of points, and for
    (v) subtracting said radius from said maximum distance as a measure of the out-of-roundness of said surface feature.

27. An apparatus for measuring the total indicated runout (TIR) of a surface feature of an object, said apparatus comprising:
  (a) positioning means for maintaining the position of the object fixed in relation to a measuring axis;
  (b) probe means for generating a signal correlated to the distance between a point on said measuring axis and each of a series of points on the surface feature, said probe means and the surface feature being movable with respect to one another while said position of the object is maintained fixed with respect to said measuring axis, and
  (c) computer means coupled to said probe means for:
    (i) storing a series of data samples of said signal, each data sample in said series of data samples being correlated to the distance between said point on said measuring axis and one of a corresponding series of points located at angularly spaced intervals on said surface feature;
    (ii) processing said series of data samples to repetitively:
      (1) identify ones of said data samples corresponding to points incapable of lying on a maximum inscribed circle of said surface feature, and
      (2) effectively discard said ones of data samples until only a predetermined number of said data samples remain in said series of data samples, said remaining data samples corresponding to points lying on said maximum inscribed circle;
    (iii) calculating the center of said maximum inscribed circle;
    (iv) calculating both the maximum distance from said center to any point in said series of points and the minimum distance from said center to any point in said series of points, and for
    (v) calculating the difference between said maximum distance and said minimum distance as a measure of the total indicated runout (TIR) of said surface feature.

28. An apparatus for measuring the eccentricity between a first surface feature and a second surface feature of an object, said apparatus comprising:

(a) positioning means for maintaining the position of the object fixed in relation to a measuring axis;

(b) probe means movable with respect to the object for generating both a first signal correlated to the distance between a point on said measuring axis and each of a first series of first points on the first surface feature and a second signal correlated to the distance between said point on said measuring axis and each of a second series of second points on the second surface feature, and (c) computer means coupled to said probe means for:
  (i) storing a first series of data samples of said first signal, each data sample in said first series of data samples being correlated to the distance between said point on said measuring axis and one of said points in said first series of points;
  (ii) processing said first series of data samples to repetitively:
    (1) identify ones of said data samples corresponding to points incapable of lying on a first maximum inscribed circle of said first surface feature, and
    (2) effectively discard said ones of said data samples from said first series of data samples until only a predetermined number of said data samples remain in said first series of data samples, said remaining data samples in said first series specifying said first maximum inscribed circle;
  (iii) calculating the center of said first maximum inscribed circle;
  (iv) storing a second series of data samples of said second signal, each data sample in said second series of data samples being correlated to the distance between said point on said measuring axis and one of said points in said second series of points;
  (v) processing said second series of data samples to repetitively:
    (1) identify ones of said data samples therein corresponding to points incapable of lying on a second maximum inscribed circle of said second surface feature, and
    (2) effectively discard said ones of said data samples from said second series of data samples until only a predetermined number of said data samples remain in said second series of data samples, said remaining data samples in said second series of data samples specifying said second maximum inscribed circle;
  (vi) calculating the center of said second maximum inscribed circle, and for
  (vii) calculating the distance between said centers of said first and second maximum inscribed circles as a measure of the eccentricity between said first and second surface features.

29. An apparatus for determining the center of a first surface feature of an object and measuring the total indicated runout (TIR) of a second surface feature of the object with reference to that center, said apparatus comprising:

(a) positioning means for maintaining the position of the object fixed in relation to a measuring axis;

(b) probe means movable with respect to the object for generating both a first signal correlated to the distance between a point on said measuring axis and each of a first series of first points on the first surface feature and a second signal correlated to the distance between said point on said measuring axis and each of a second series of second points on the second surface feature, and (c) computer means coupled to said probe means for:
  (i) storing a first series of data samples of said first signal, each data sample in said first series of data samples being correlated to the distance between said point on said measuring axis and one of said points in said first series of points;
  (ii) processing said first series of data samples to repetitively:
    (1) identify ones of said data samples therein corresponding to points incapable of lying on a maximum inscribed circle of said first surface feature, and
    (2) effectively discard said ones of said data samples from said first series of data samples until only a predetermined number of said data samples remain in said first series of data samples;
  (iii) determining the center of said first surface feature by calculating the location of the center of a circle which intersects each of said ones of said first points represented by said data samples remaining in said first series of data samples;
  (iv) calculating both the maximum distance from said center to any said second point in said second series of second points and the minimum distance from said center to any second point in said second series of second points, and for
  (v) calculating the difference between said maximum distance and said minimum distance to obtain a measurement of the total indicated runout (TIR) of the second surface feature with respect to the center of the first surface feature.

30. An apparatus for determining the center of a surface feature of an object, said apparatus comprising:

(a) positioning means for maintaining the position of the object fixed in relation to a measuring axis;

(b) probe means for generating a signal correlated to the distance between a point on said measuring axis and each of a series of points on the surface feature, said probe means and the surface feature being movable with respect to one another, and (c) computer means coupled to said probe means for:
  (i) storing a series of data samples of said signal, each data sample in said series of data samples being correlated to the distance between said point on said measuring axis and one of said points in said series of said points;
  (ii) for each set of three data samples remaining in said series of data samples corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
  (iii) reducing said series of data samples by eliminating therefrom the data sample remaining therein which corresponds to that vertex the distance between which and its associated fourth point is the smallest;
  (iv) repeating steps (ii) and (iii) to further reduce said series of data samples until only a predetermined number of samples representing particular ones of said points in said series of points remain therein, and for (v) calculating the location of the center of a circle which intersects each of said particular ones of said points to determine the center of said surface feature.

31. An apparatus for measuring the effective size of a surface feature of an object, said apparatus comprising:
(a) positioning means for maintaining the position of the object fixed in relation to a measuring axis;
(b) probe means for generating a signal correlated to the distance between a point on said measuring axis and each of a series of points on the surface feature, said probe means and the surface feature being movable with respect to one another, and
(c) computer means coupled to said probe means for:
  (i) storing a series of data samples of said signal, each data sample in said series of data samples being correlated to the distance between a point on said measuring axis and one of said points in said series of points;
  (ii) for each set of three data samples in said series of data samples corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
  (iii) reducing series of data samples by eliminating therefrom the data sample remaining therein which corresponds to that vertex the distance between which and its associated fourth point is the smallest;
  (iv) repeating steps (ii) and (iii) to further reduce said series of data samples until only a predetermined number of samples representing particular ones of said points in said series of points remain in said series of data samples, and for
  (v) calculating the diameter of the circle which intersects each of said particular ones of said points as a measure of the effective size of said surface feature.

32. An apparatus for measuring the out-of-roundness of a surface feature of an object, said apparatus comprising:
(a) positioning means for maintaining the position of the object fixed in relation to a measuring axis;
(b) probe means for generating a signal correlated to the distance between a point on said measuring axis and each of a series of points on the surface feature, said probe means and the surface feature being movable with respect to one another, and
(c) computer means coupled to said probe means for:
  (i) storing a series of data samples of said signal, each data sample in said series of data samples being correlated to the distance between said point on said measuring axis and one of said points in said series of points;
  (ii) for each set of three data samples in said series of data samples corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
  (iii) reducing said series of data samples by eliminating the remaining data sample in said series corresponding to that vertex the distance between which and its corresponding fourth point is the smallest;
  (iv) repeating steps (ii) and (iii) to further reduce said series of data samples until only a predetermined number of samples representing particular ones of said points in said series of points remain in said series of data samples;
  (v) calculating the radius and center of a circle intersecting each of said particular ones of said points;
  (vi) calculating the maximum distance between said center and any of said points in said series of points, and for
  (vii) subtracting said radius from said maximum distance to obtain a measurement of the out-of-roundness of said surface feature.

33. An apparatus for measuring the total indicated runout (TIR) of a surface feature of an object, said apparatus comprising:
(a) positioning means for maintaining the position of the object fixed in relation to a measuring axis;
(b) probe means for generating a signal correlated to the distance between a point on said measuring axis and each of a series of points on the surface feature, said probe means and the surface feature being movable with respect to one another, and
(c) computer means coupled to said probe means for:
  (i) storing a series of data samples of said signal, each data sample in said series of data samples being correlated to the distance between said point on said measuring axis and one of said points in said series of said points;
  (ii) for each set of three data samples remaining in said series of data samples corresponding to a group of three adjacent ones of said points on said surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
  (iii) reducing said series of data samples by eliminating therefrom the data sample remaining therein which corresponds to that vertex the distance between which and its associated fourth point is the smallest;
  (iv) repeating steps (ii) and (iii) to further reduce said series of data samples until only a predetermined number of samples representing particular ones of said points in said series of points remain in said series of data samples;
  (v) calculating the location of the center of a circle which intersects said particular ones of said points to determine the center of said surface feature;
  (vi) calculating both the maximum distance from said center to any point in said series of points and the minimum distance from said center to any point in said series of points, and for (vii) calculating the difference between said maximum distance and said minimum distance to obtain a measurement of the total indicated runout (TIR) of said surface feature.

34. An apparatus for determining the center of a first surface feature of an object and measuring the total indicated runout (TIR) of a second surface feature of the object with respect to that center, said apparatus comprising:

(a) positioning means for maintaining the position of the object fixed in relation to a measuring axis;

(b) probe means movable with respect to the object for generating both a first signal correlated to the distance between a point on said measuring axis and each of a first series of first points on the first surface feature and a second signal correlated to the distance between said point on said measuring axis and each of a second series of second points on the second surface feature, and (c) computer means coupled to said probe means for:
(i) storing a first series of data samples of said first signal, each data sample in said first series of data samples being correlated to the distance between said point on said measuring axis and one of said points in said first series of points;
(ii) for each set of three data samples remaining in said first series of data samples corresponding to a group of three adjacent ones of said points on said first surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
(iii) reducing said first series of data samples by eliminating therefrom the remaining data sample corresponding to that vertex the distance between which and its corresponding fourth point is the smallest;
(iv) repeating steps (ii) and (iii) to further reduce said first series of data samples until only a predetermined number of data samples representing particular ones of said points in said first series of points remain in said first series of data samples;
(v) determining the center of said first surface feature by calculating the location of the center of a circle which intersects each of said samples of predetermined number;
(vi) calculating both the maximum distance from said center to any point in said second series of points and the minimum distance from said center to any point in said second series of points, and for
(vii) calculating the difference between said maximum distance and said minimum distance to obtain a measurement of the total indicated runout (TIR) of the second surface feature with respect to the center of the first surface feature.

35. An apparatus for measuring the eccentricity between a first surface feature and a second surface feature of an object, said apparatus comprising:

(a) positioning means for maintaining the position of the object fixed in relation to a measuring axis;

(b) probe means movable with respect to the object for generating a first signal correlated to the distance between a point on said measuring axis and each of a first series of first points on the first surface feature and a second signal correlated to the distance between said point on said measuring axis and each of a second series of second points on the second surface feature, and (c) computer means coupled to said probe means for:
(i) storing a first series of data samples of said first signal, each data sample in said first series of data samples being correlated to the distance between said point on said measuring axis and one of said points in said first series of points;
(ii) storing a second series of data samples of said second signal, each data sample in said second series of data samples being correlated to the distance between said point on said measuring axis and one of said points in said second series of points;
(iii) for each set of three data samples remaining in said first series of data samples corresponding to a group of three adjacent ones of said points on said first surface feature, each said group having a vertex separating two endpoints, calculating a fourth point defined by the intersection of the perpendicular bisectors of a first line and a second line, said first line connecting said vertex with one of said endpoints, said second line connecting said vertex with the other one of said endpoints;
(iv) reducing said first series of data samples by eliminating therefrom the data sample remaining therein which corresponds to that vertex the distance between which and its associated fourth point is the smallest;
(v) repeating steps (iii) and (iv) to further reduce said first series of data samples until only a first predetermined number of data samples representing particular ones of said points in said first series of points remain in said first series of data samples;
(vi) determining the center of said first surface feature by calculating the location of the center of a first circle which intersects each of said samples of said first predetermined number;
(vii) for each set of three data samples remaining in said second series of data samples corresponding to a group of three adjacent ones of said points on said second surface feature, each said group having a vertex separating two endpoints, calculating a fifth point defined by the intersection of the perpendicular bisectors of a third line and a fourth line, said third line connecting said vertex with one of said endpoints, said fourth line connecting said vertex with the other one of said endpoints;
(viii) reducing said second series of data samples by eliminating therefrom the data sample remaining therein which corresponds to that vertex the distance between which and its corresponding fifth point is the smallest;
(ix) repeating steps (vii) and (viii) to further reduce said second series of data samples until only a second predetermined number of samples representing particular ones of said points in said second series of points remain in said second series of data samples;
(x) determining the center of said second surface feature by calculating the location of the center of a second circle which intersects each of said samples of said second predetermined number, and for (xi) calculating the distance between said centers of said first and second surface features, respectively as a measure of the eccentricity between said first and second surface features.

36. An apparatus for measuring a second surface feature of an object with respect to the center of a first surface feature of the same object without requiring the center to be physically aligned with a measuring reference, said apparatus comprising:

(a) positioning means for maintaining the position of the object fixed in relation to a measuring axis;

(b) probe means movable with respect to the object for generating both a first signal correlated to the distance between a point on said measuring axis and each of a first series of first points on the first surface feature as well as a second signal correlated to the distance between said point on said measuring axis and each of a second series of second points on the second surface feature, and (c) computer means coupled to said probe means for:

(i) storing a first series of data samples of said first signal, each data sample in said first series of data samples being correlated to the distance between said point on said measuring axis and one of said points in said first series of points;

(ii) storing a second series of data samples of said second signal, each data sample in said second series of data samples being correlated to the distance between said point on said measuring axis and one of said points in said second series of points;

(iii) calculating the coordinates of the center of said first surface feature using said first series of data samples;

(iv) calculating the coordinates of each point in said second series of points;

(v) generating and storing a coordinate-corrected representation of said second series of points in accordance with the magnitude and angle of a vector relating said coordinates of said center to said point on said measuring axis, and for (vi) calculating at least one measurement figure using said coordinate-corrected representation.

37. A method of measuring a second surface feature of an object with respect to the center of a first surface feature of the same object without requiring the center to be physically aligned with a measuring reference, said method comprising the steps of:

(a) mounting the object on a machine in fixed relation to a measuring axis of said machine, said machine including first and second probes for generating respective first and second signals;

(b) effecting relative movement between said object and said first probe in order to generate said first signal, said first signal being correlated to the distance between the first surface feature and said point on said measuring axis;

(c) effecting relative movement between said object and said second probe in order to generate said second signal, said second signal being correlated to the distance between the second surface feature and said point on said measuring axis;

(d) storing a first series of data samples of said first signal, each sample in said first series being correlated to the distance between said point on said measuring axis and one of a corresponding first series of points located at angularly spaced intervals on said first surface feature;

(e) storing a second series of data samples of said second signal, each sample in said second series being correlated to the distance between said point on said measuring axis and one of a corresponding second series of points located at angularly spaced intervals on said second surface feature;

(f) calculating the coordinates of the center of said first surface feature using said first series of data samples;

(g) calculating the coordinates of each point in said first series of points;

(h) generating and storing a coordinate-corrected representation of said second series of points in accordance with the magnitude and angle of a vector relating said coordinates of said center to said point on said measuring axis, and (i) calculating at least one measurement figure using said coordinate-corrected representation.

38. An apparatus for measuring a second surface feature of an object with respect to the center of a first surface feature of the same object without requiring the center to be physically aligned with a measuring reference, said apparatus comprising:

(a) positioning means for maintaining the position of the object fixed in relation to a measuring axis;

(b) probe means for generating both a first signal correlated to the distance between a point on said measuring axis and each of a first series of first points on the first surface feature as well as a second signal correlated to the distance between said point on said measuring axis and each of a second series of second points on the second surface feature, and (c) computer means connected to said probe means for:

(i) generating using said first signal a third signal indicating the magnitude and angle of the positional offset between the said measuring axis and the center of said first surface feature;

(ii) combining said third signal with said second signal to form a coordinate-corrected signal, and (iii) calculating at least one measurement figure using said coordinate-corrected signal.

39. A method of measuring a second surface feature of an object with respect to the center of a first surface feature of the same object without requiring the center to be physically aligned with a measuring reference, said method comprising the steps of:

(a) mounting the object on a machine in fixed relation to a measuring axis of said machine, said machine including first and second probes for generating respective first and second signals;

(b) effecting relative movement between said object and said first probe in order to generate said first signal, said first signal being correlated to the distance between the first surface feature and said point on said measuring axis;

(c) effecting relative movement between said object and said second probe in order to generate said second signal, said second signal being correlated to the distance between the second surface feature and said point on said measuring axis;

(d) generating using said first signal a third signal indicating the magnitude and angle of the positional offset between the said measuring axis and the center of said first surface feature;

(e) combining said third signal with said second signal to form a coordinate-corrected signal, and (f) calculating at least one measurement figure using said coordinate-corrected signal.

40. An apparatus for measuring wheels of the type having a pilot hole bounded by an interior edge and at least one surface feature surrounding the pilot hole, said apparatus comprising:

(a) fixture means for holding the wheel in fixed relation to a measuring axis;

(b) first probe means for generating a first signal correlated to the distance between said edge and said axis, said first probe means having a member mounted in distance-sensing relation with said edge;

(c) second probe means for generating a second signal correlated to the distance between said edge and said axis, said second probe means having a member mounted in distance-sensing relation with said surface feature;

(d) drive means connected to said fixture means for effecting relative rotation about said axis between the wheel and at least said first probe means;

(e) center determining means connected to said first probe means for determining based on said first signal the positional offset between said measuring axis and the center of said pilot hole;

(f) correcting means for adjusting said second signal in accordance with said positional offset to generate a corrected second signal, and (g) calculating means for calculating at least one measurement figure based on said corrected second signal.

41. The apparatus of claim 40 wherein said first probe means comprises:

(a) an electromechanical transducer including a first member mounted in a fixed position with respect to said measuring axis and a second member movable with respect to said measuring axis and means for generating said first signal in accordance with the distance between said first and second members, and (b) biasing means for maintaining mechanical contact between said second member and said edge while said relative rotation takes place.

42. The apparatus of claim 41 further comprising retraction means for selectively retracting said second member.

43. The apparatus of claim 41 wherein said electromechanical transducer comprises a differential transformer.

44. The apparatus of claim 41 wherein said biasing means comprises a pneumatic cylinder having a movable member mechanically coupled to said second member.

* * * * *